United States Patent [19]

Nagato et al.

[11] Patent Number: 4,819,008
[45] Date of Patent: Apr. 4, 1989

[54] THERMAL HEAD DRIVER CIRCUIT

[75] Inventors: Hitoshi Nagato; Shuzo Hirahara, both of Yokohama; Tadayoshi Ohno, Kawasaki, all of Japan

[73] Assignee: Kabushiki Kaisha Toshiba, Kawasaki, Japan

[21] Appl. No.: 75,296

[22] Filed: Jul. 17, 1987

Related U.S. Application Data

[63] Continuation of Ser. No. 841,958, Mar. 20, 1986, abandoned.

[30] Foreign Application Priority Data

Mar. 26, 1985 [JP] Japan ................................ 60-61365
Mar. 30, 1985 [JP] Japan ................................ 60-67485

[51] Int. Cl.$^4$ .................... G01D 15/10; H04N 1/22
[52] U.S. Cl. ........................... 346/76 PH; 219/216; 358/298
[58] Field of Search ................ 346/76 PH, 76 R; 219/216, 543; 358/298

[56] References Cited

U.S. PATENT DOCUMENTS

| | | | |
|---|---|---|---|
| 3,710,913 | 1/1973 | Brennan, Jr. et al. | 400/320 |
| 3,975,707 | 8/1976 | Ito et al. | 346/76 R |
| 4,475,114 | 10/1984 | Koyama et al. | 346/76 PH |
| 4,536,774 | 8/1985 | Inui et al. | 346/76 PH |
| 4,563,691 | 1/1986 | Noguchi et al. | 346/76 PH |
| 4,563,693 | 1/1986 | Masaki | 346/76 PH |
| 4,575,732 | 3/1986 | Kitaoka | 346/76 PH |

FOREIGN PATENT DOCUMENTS

| | | | |
|---|---|---|---|
| 2928304 | 1/1980 | Fed. Rep. of Germany | 358/86 |
| 3407594 | 8/1984 | Fed. Rep. of Germany | 400/120 |
| 3329311 | 2/1985 | Fed. Rep. of Germany | 400/120 |
| 56-98183 | 8/1981 | Japan | 400/120 |

OTHER PUBLICATIONS

Proceedings of 2nd Non-Impact Printing Technology Symposium, No. 5-2, "Color Ink Transfer Recording Using MultiThermal Printing Head and Sublimation Dye"; T. Saito, et al.; Jul. 25, 1985.

Primary Examiner—Joseph W. Hartary
Assistant Examiner—Gerald E. Preston
Attorney, Agent, or Firm—Oblon, Fisher, Spivak, McClelland & Maier

[57] ABSTRACT

A thermal head driver circuit is disclosed, which comprises a thermal head including a plurality of heat generation elements in an array, a shift register for storing image data including a plurality of bits for a plurality of heat generation elements, signal generation circuit for generating a print signal having a duration corresponding to image data for each of said heat generation elements held in said shift register, and driving circuit for energizing the heat generation elements of the thermal head according to the print signal. The shift register has parallel data input terminals, to which all of image data including a plurality of bits for each of said heat generation elements are fed at a time. Image data is supplied in a single transfer from an external device to the driver circuit. The signal generation circuit includes a counter for counting a clock signal, a plurality of comparators for comparing the count of the counter and image data of each heat generation element and providing an output signal when the count of the counter is greater than image data of each heat generation element, and a plurality of gates, to which the print signal and the output signals of the plurality of comparators are fed.

12 Claims, 24 Drawing Sheets

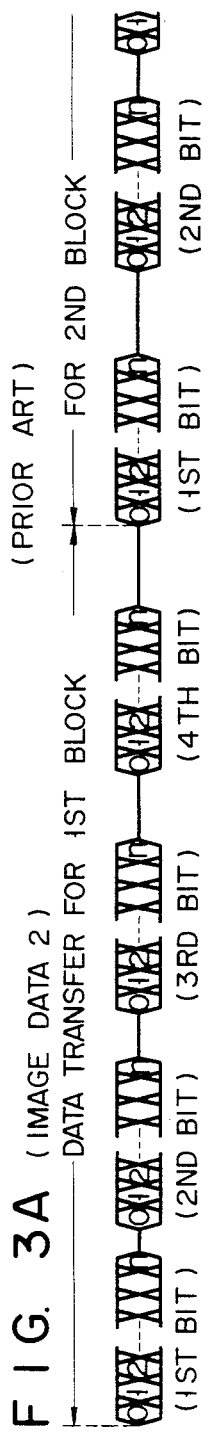
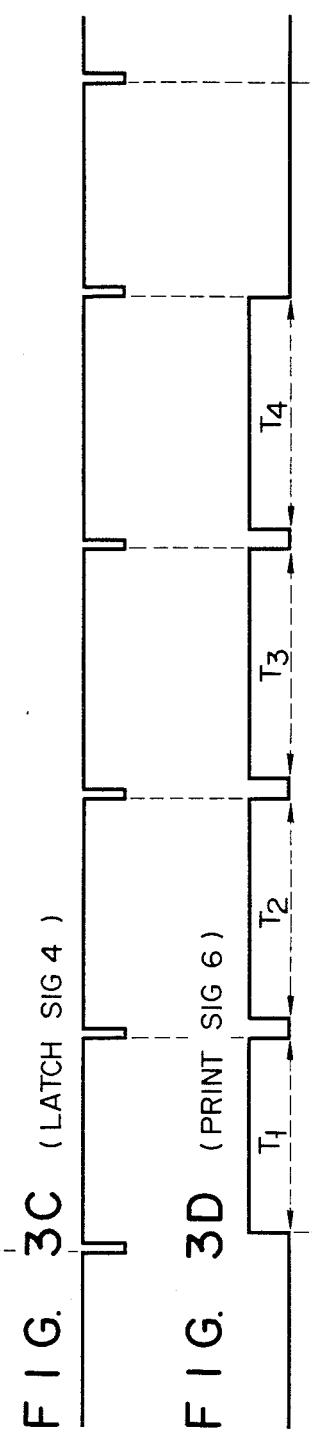
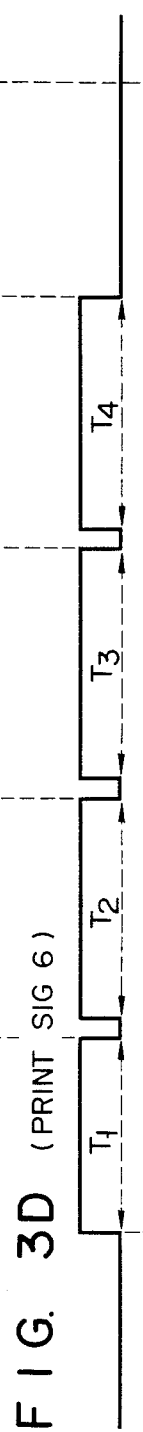
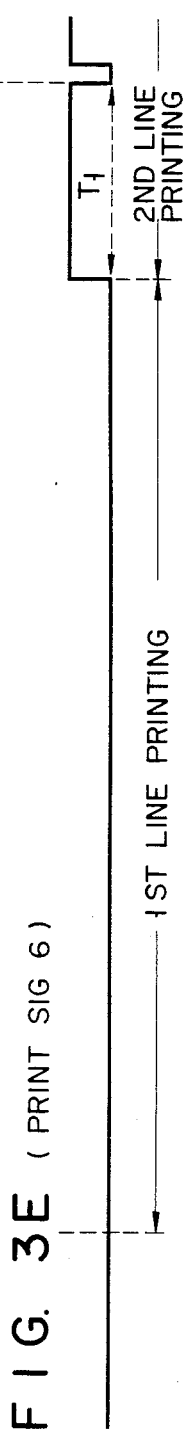
FIG. 3A (IMAGE DATA 2) (PRIOR ART)
FIG. 3B (CLK SIG 3)
FIG. 3C (LATCH SIG 4)
FIG. 3D (PRINT SIG 6)
FIG. 3E (PRINT SIG 6)

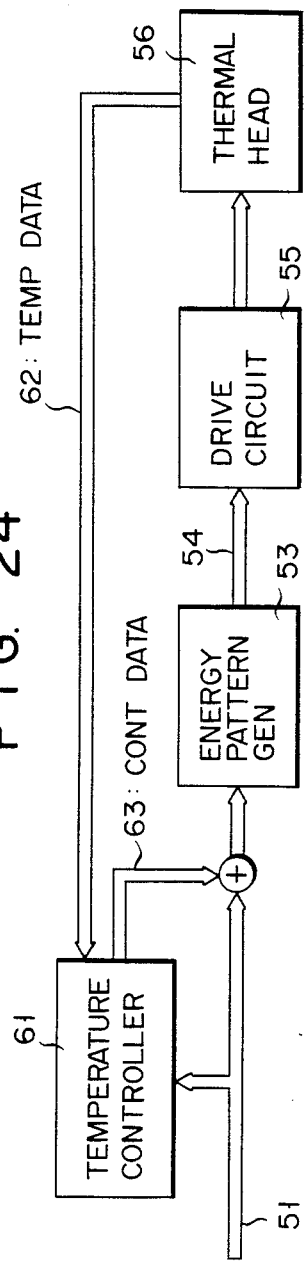
F I G. 24
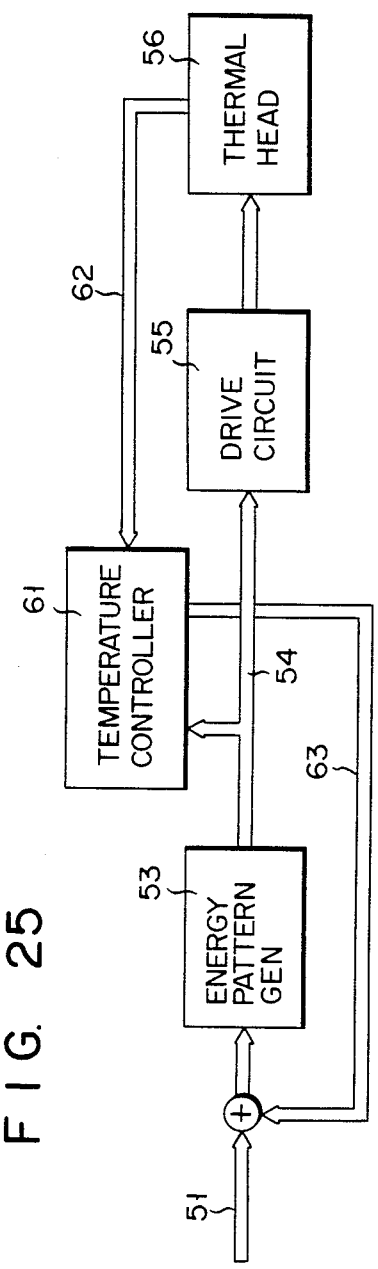
F I G. 25

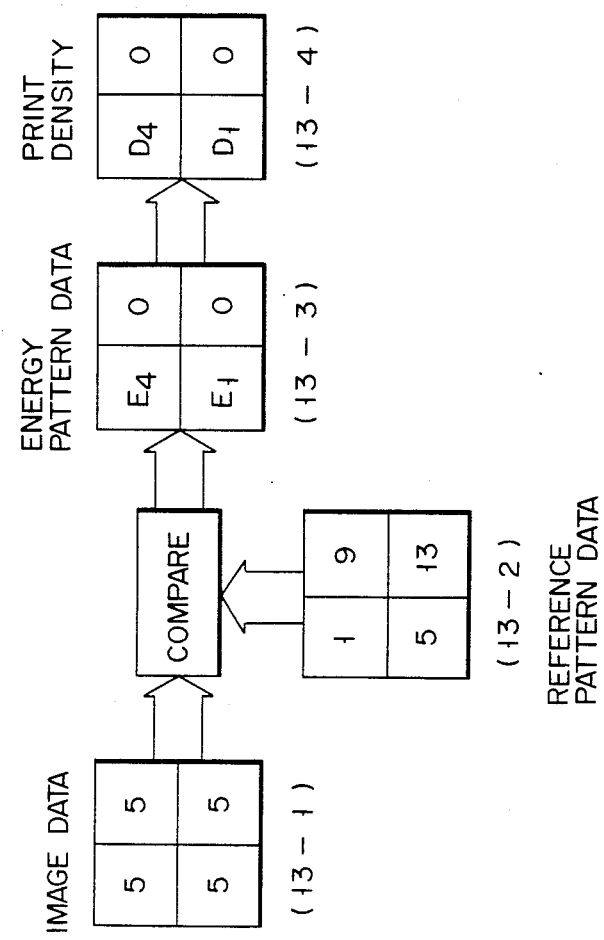

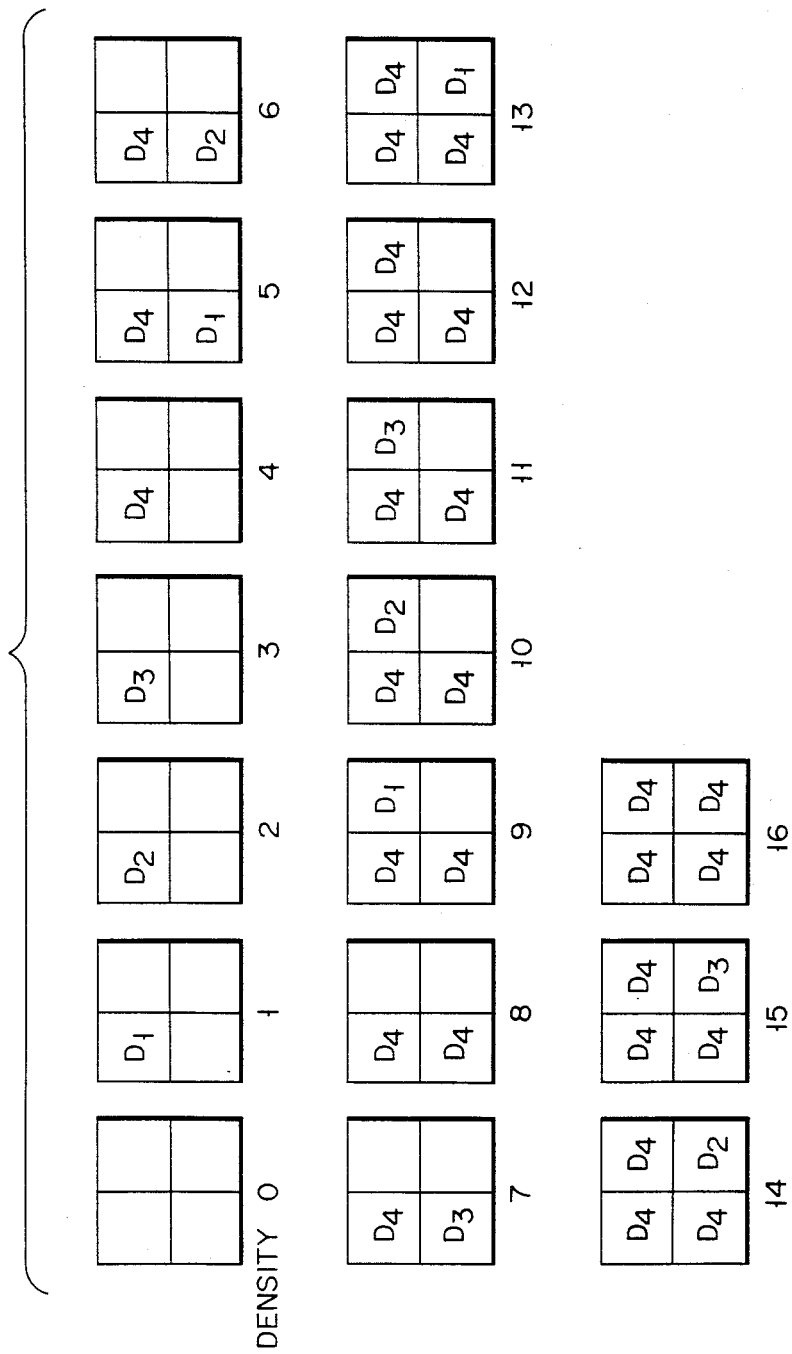

THERMAL HEAD DRIVER CIRCUIT

This application is a continuation of application Ser. No. 841,958, filed on Mar. 20, 1986, now abandoned.

BACKGROUND OF THE INVENTION

This invention relates to a thermal head driver circuit for a thermal printer.

Recently, various office automation apparatuses are used to improve business efficiency. Among various office automation apparatuses, thermal printers, typically thermal transfer printers, are becoming increasingly popular because they are quieter, have a relatively simple structure and are easy to maintain.

Relatively recent thermal printers are capable of producing clear colors and a recent trend has been to employ these printers as color printers.

Considerable research and development has been invested in intermediate tone expression by thermal printers. As typical approaches, there are an area graduation process, in which intermediate tones are expressed by binalizing image data by a dither method or the like, and a density graduation process, in which the heat generation of each heat generation element of a thermal head is controlled according to image data for each picture element, thereby varying the area of a print dot to vary the image density.

In the mean time, with a thermal printer it is liable that when the printing speed is increased, accurate print image density control can not be obtained due to heat storage in heat generation elements of the thermal head. This is so because with an increase of the printing speed the heat energization cycle is shortened so that a new energization cycle is started while the heat generated in the previous cycle has not yet been sufficiently radiated. If such heat storage proceeds, considerable heat different is provided between a continually energized heat generation element and a newly energized heat generation element, resulting in a wide density difference between print dots.

In order to eliminate such adverse effects of the heat storage, it is considered to control the amount of energy supplied to each heat generation element of the thermal head. More specifically, it is thought to supply an energization pulse having a short duration compared to the normal energization pulse to a heat generation element, which has been repeatedly energized for a number of times and also to a newly energized heat generation element adjacent to heat generation elements which have been repeatedly energized. With this method, it is possible to preclude the adverse effects of the heat storage. However, it is necessary to vary the pulse duration according to the status of printing. Further, energization pulses corresponding in number to graduations which are greater in number than the actually printed graduations. Therefore, the circuit construction becomes complex.

In the case of the density graduation process the duration of the pulse supplied to the heat generation element has to be finely controlled to provide a large number of graduations. Particularly, to obtain a high speed density graduation printing the pulse duration should be controlled more accurately in view of the influence of the heat storage.

A prior art thermal head driver circuit for effecting such an energization pulse duration will be described with reference to FIG. 1. Image data 2 representing the density of each picture element is supplied to series input terminal $S_{IN}$ of shift register 1. The image data is 4-bit data for each picture element, and image data for each bit are fed continuously. For example, the first bit (i.e., least significant bit) of image data for each picture element is successively fed to shift register 1, and the second to fourth (i.e., most significant) bits of each picture element image data are successively fed to shift register 1. Image data of one bit fed to series input terminal $S_{IN}$ of shift register 1 is transferred through stages thereof in synchronism to a clock signal 3. Heating section 9 of the thermal head consists of a plurality of heat generation resistors. When image data 2 for picture elements corresponding in number to the number of the heat generation resistors have been fed to and transferred through shift register 1, the supply of the clock signal 3 is discontinued to discontinue the transfer of image data 2. At this time, a latch signal 4 is fed to clock terminal CK of each flip-flop of latch circuit 5, whereby image data output from series output terminal $S_{OUT}$ of each stage of shift register 1 is latched in a flip-flop of each stage of latch circuit 5. Output terminal Q of the flip-flop of each stage of latch circuit 5 is connected to a first input terminal of AND gates constituting gate circuit 7.

When print signal 6 is generated and fed to a second input terminal of AND gates of gate circuit 7, each AND gate is enabled when and only when the output data of a corresponding flip-flop of latch circuit 5 is "1". Therefore, when image data is "1", a transistor constituting driver circuit 8 is turned on according to a print signal 6, causing current to flow to a heating resistor of thermal head heating section 9. Thermal printing is thus done by the heat which is generated. The above operation takes place repeatedly for the first (least significant) to the fourth (mast significant) bits of image data of each picture element.

When the pulse durations of print signals $T_1$ to $T_4$ for the first (least significant) to fourth (most significant) bits are set such that $T_1 : T_2 : T_3 : T_4 = 1:2:4:8$, as shown in FIG. 2A, the density of each picture element can be expressed in 16 different graduations with 4-bit image data. For example, when the first (lest significant) to fourth (most significant) bits of image data are 1011, respectively, energization pulses as shown in FIG. 2B are supplied to the heat generation resistors.

FIGS. 3A to 3E are timing charts showing the operation of a line thermal head with heat generation resistors arranged linearly. In this case, if all the heat generation resistors of the line thermal head are energized at a time, an extremely large energization current is caused. This means that power source which has a sufficiently large current capacity is needed. Accordingly, the heat generation section of the thermal head is divided into two blocks so that the section is energized block by block. FIG. 3A shows image data 2. Image data 2 for the first bit (n being the number of heat generation resistors of one block) is transferred through shift register 1 according to a clock signal 3 shown in FIG. 3B. When the transfer of image data of the first bit is ended, a latch signal 4 as shown in FIG. 3C is generated, whereby the image data of the first bit is latched in latch circuit 5. When a print signal 6 ($T_1$) is generated as shown in FIG. 3D, current is caused to flow through only the heat generation resistor which is connected to latch circuit flip-flops, in which data "1" among the first bit image data is latched. In this way, the printing is effected.

Further, the transfer of image data for the second bit (including the input to shift register 1) is effected while image data for the first bit is being printed. When the printing with the first block is ended, the printing with the second block is effected. That is, the transfer of image data of the first bit in the second block is effected while the image data for the fourth bit in the first block is being printed.

With the above prior art thermal head driver circuit, the energization pulse can be pulse duration modulated into 16 different pulses. In the case of the two-block driving, however, it is necessary to transfer data eight times from an external device to the shift register. For this reason, a considerable time is necessary for the printing of data for one line. This drawback will now be discussed in greater details.

A case is now considered, in which a line thermal head (4,096 dots) for an A4 size width with a line printing cycle period of 1 msec. and a resolution of 16 dots/mm is used. In this case, the printing period for one block is 0.5 msec. During this period of 0.5 msec., 2,048-bit data has to be transferred four times from the external device to the shift register. This means that the frequency of the clock signal for the transfer of data through the shift register is as high as 16 MHz. Actually, it is impossible to cause transfer of data through the shift register at such a high speed. Accordingly, it is thought to increase the blocks to eight blocks, divide all the image input terminals of the thermal head into eight blocks, and supply image data as parallel data to each block. In this case, the clock frequency can be reduced to 4 MHz. At present, however, the highest available thermal head clock frequency is 2 MHz which is far lower than 4 MHz. When such a thermal head is used, it is necessary to provide 16 image input terminals. Therefore, an increased number of lines are necessary for supplying data to the thermal head. Or, a buffer memory is necessary for dividing one line data into 16 divisions and holding the divided data to supply the data to the thermal head. This increases the scale of the electric circuitry for supplying data to the thermal head. For this reason, it has been impossible to realize a high speed thermal printer with a one line printing time of 1 msec.

Further, even if it is possible to transfer data at a clock frequency of 4 MHz, one cycle of data transfer takes 128 $\mu$sec. when the thermal head is driven by 8-block driving. The time necessary for one cycle of printing should not be made shorter than this data transfer period. This is so because if an energization pulse shorter than one data transfer cycle period, there will occur a printing-free period between adjacent printing cycles. In such a case, it is very troublesome to compensate for the heat storage. If the pulse duration is set to be equal to one data transfer cycle period (i.e., 128 $\mu$sec.), eight printing cycles can be effected in 1,024 msec. In this case, therefore, a line printing cycle period of 1 msec. can be realized only in case when the pulses $T_1$ to $T_4$ have the same pulse duration. If the pulses $T_1$ to $T_4$ are all of the same pulse duration, only four different pulse durations can be obtained, and it is impossible to effect which the graduation printing on fine energization pulse duration control for precluding the influence of the heat storage.

As has been shown, with the prior art thermal head driver circuit it has been impossible to simultaneously realize high speed and multiple graduation printing free from the influence of the heat storage.

SUMMARY OF THE INVENTION

This invention has been intended in the light of the above situation, and its object is to provide a thermal head driver circuit, which permits high speed data transfer and multiple graduation printing, preclusion of adverse effects of heat storage.

The thermal head driver circuit according to the invention comprises:
thermal head printing means having a plurality of heat generation elements in an array;
data holding means for storing image data for a plurality of heat generation elements, the data holding means having parallel input data terminals to which all the image data including a plurality of bits for each of heat generation element are fed, signal generating means for providing a driving signal having a duration corresponding to image data for each heat generation element held in data holding means, and driving means for energizing each heat generation element of the thermal printing means according to the drive signal.

BRIEF DESCRIPTION OF THE DRAWINGS

FIGS. 3A to 3E show a timing chart illustrating the operation of the thermal head driver circuit shown in FIG. 1;

FIG. 24 is a block diagram showing a twelfth embodiment of the thermal head driver circuit according to the invention;

FIG. 25 is a block diagram showing a modification of the twelfth embodiment;

FIG. 27 is a view illustrating the principles underlying a thirteenth embodiment of the thermal head driver circuit according to the invention; and FIG. 28 is a view illustrating the relation between the image data and print density of each picture element in the thirteenth embodiment.

DETAILED DESCRIPTION OF THE PREFERRED EMBODIMENTS

Figure 4:
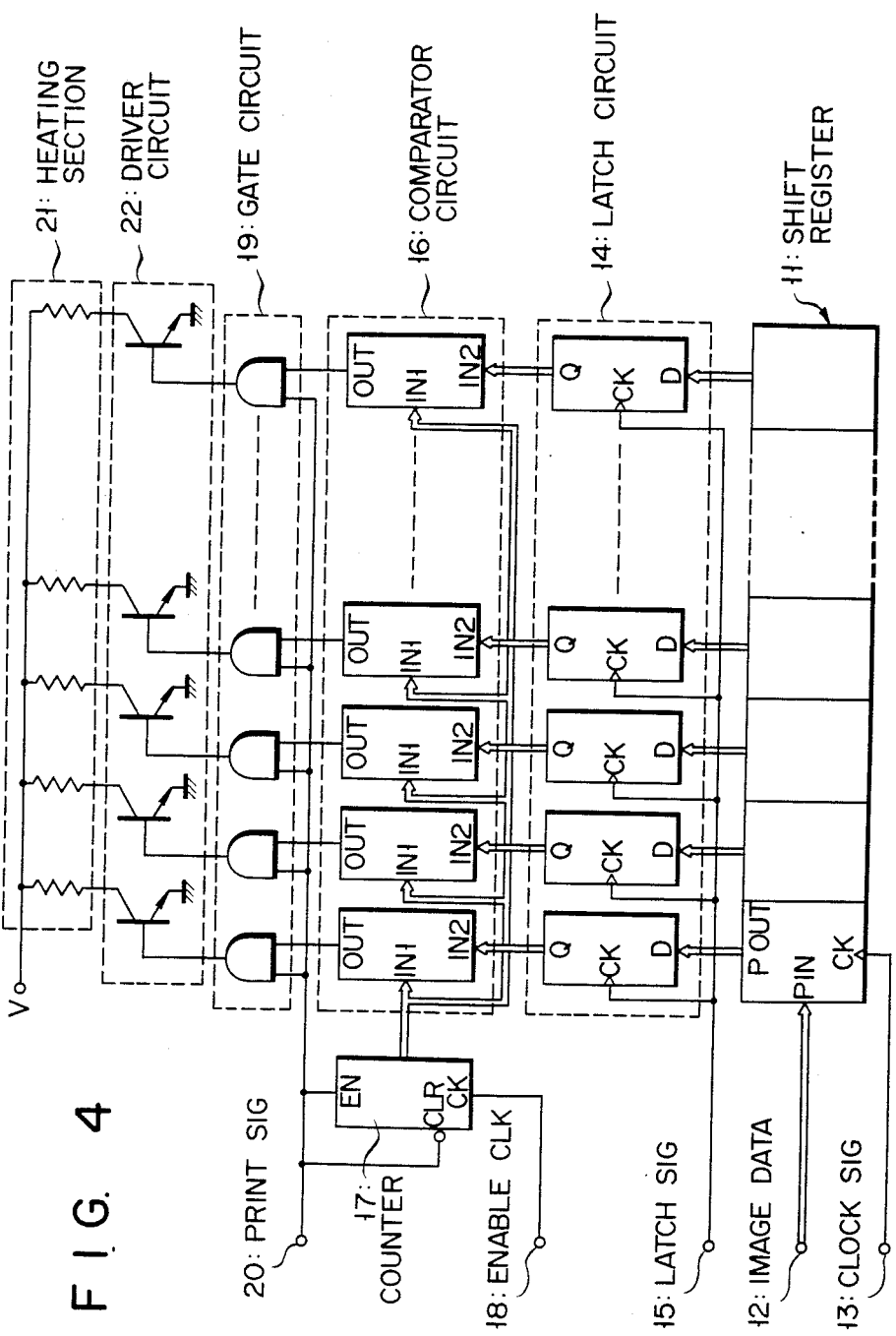
FIG. 4 is a circuit diagram showing a first embodiment of the thermal head driver circuit according to the invention.

Now, an embodiment of the thermal head driver circuit according to the invention will be described with reference to the drawings. FIG. 4 is a block diagram showing an embodiment of the circuit construction. Image data 12 supplied from an image data source (not shown) and representing the density of each picture element in a plurality of bits is supplied to parallel input terminals $P_{IN}$ of shift register 11 consisting of a plurality of flip-flop stages.

Figure 5:
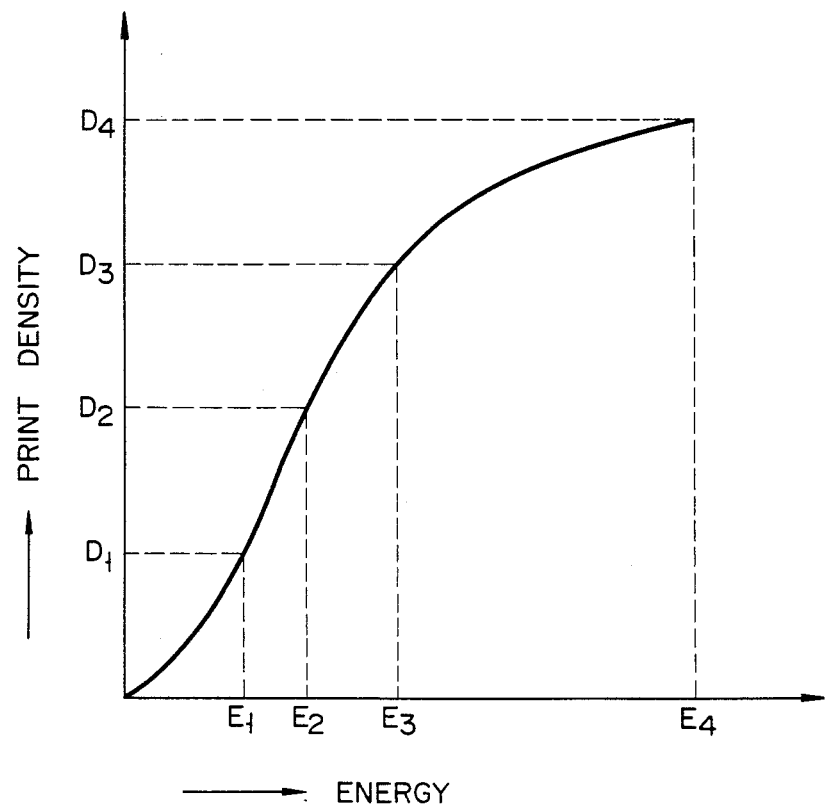
FIG. 5 is a graph showing the relation between amount of supplied energy and print density obtained with the first embodiment.

Image data 12 is not an image density signal obtained directly from a scanner or a television signal itself. It is obtained by correcting such a density signal according to density characteristics of a printer. Generally, in a thermal head the amount of energy supplied to a heat-generating resistor and the print density of the printed image are in a nonlinear relation as shown in FIG. 5. Therefore, if such a density signal is used as energization pulses, it is sometimes impossible to obtain printing at a desired density.

Shift register 11 has the same number of stages as the number of heat-generating resistors constituting a heating section 21 of the thermal head. Image data input to parallel input terminals $P_{IN}$ of shift register 11 is transferred through shift register 11 in synchronism to clock signal 13. When image data is fed to all the flip-flop stages of shift register 11, the supply of clock signal 13 is stopped. Then, the transfer of image data is stopped. At the same time, latch signal 15 is fed to clock terminal CK of each of a plurality of flip-flops constituting latch circuit 14, and image data fed to input terminal D from each stage parallel output terminals $P_{OUT}$ of shift register 11 is latched in latch circuit 14.

Output terminal Q of each flip-flop of latch circuit 14 is connected to comparator circuit 16. Comparator circuit 16, like latch circuit 14, consists of comparators corresponding in number to the number of heat-generating resistors constituting a heating section 21 of the thermal head. The output signal from each Q terminal of latch circuit 14 is fed to second input terminal $IN_2$ of each comparator. A count of counter 17 for counting enable clock signal 18 which is different form clock signal 13 is supplied to first input terminal $IN_1$ of each comparator. Each comparator provides a a one-bit signal at "0" level when the data at first input terminal $IN_1$ is greater than data at second input terminal $IN_2$ and provides a one-bit signal at "1" level when the data at first input terminal $IN_1$ is equal to or less than the data at second input terminal $IN_2$. The output from output terminal OUT of each comparator is initially at "1" level and is changed to "0" level when the count of counter 17 becomes greater than the output data of each flip-flop of latch circuit 14.

Output terminal of each comparator of comparator circuit 16 is connected to a first input terminal of each AND gate of gate circuit 19. Print signal 20 is supplied to a second input terminal of each AND gate of gate circuit 19. Print signal 20 goes to "1" level during a predetermined print period. Thus, when print signal 20 and the output of comparator of comparator circuit 16 are both at "1" level, a print output at "1" level is generated from an AND gate of gate circuit 19 to turn on a corresponding transistor in driver circuit 22. A heat generation resistor in the heating section 21 is thus energized to provide heat to effect printing. When the image data is "0", no driving transistor is turned on with a change of the print signal level to "1" level, so that no printing is effected. The print signal is also fed to counter 17 to clear the same.

Now, the operation of the first embodiment shown in FIG. 4 applied to a line thermal head will be explained with reference to a timing chart shown in FIGS. 6A to 6F. The line thermal head usually consists of 2,000 to 4,000 heat generation resistors. To energize all these heat generation resistors at a time, a large capacity power source is necessary. Usually, therefore, the heat generation resistors are grouped into a plurality of blocks to drive then block by block. The timing chart of FIGS. 6A to 6F corresponds to a case where heat generation resistors are grouped into two blocks. In this case, the driver circuits has two unit circuits (FIG. 4). The shift registers of two unit circuits are serially connected to each other.

Figure 6:
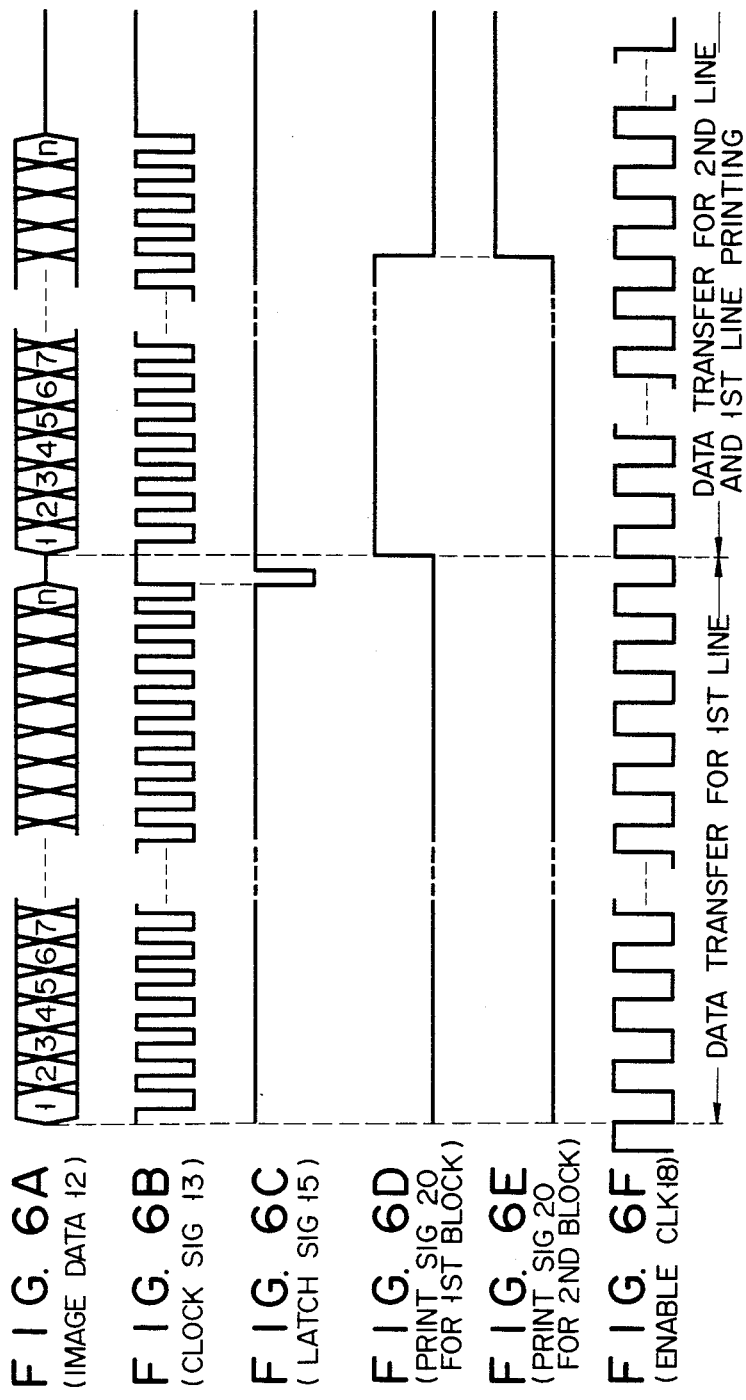
FIGS. 6A to 6F show a timing chart illustrating the operation of the first embodiment.

Image data (n) of the first line as shown in FIG. 6A, (n being the number of heat generation resistors in one line) to shift register 11. Image data for each picture element is transferred through shift register 11 (through first and second blocks) according to clock signal 13 shown in FIG. 6B. When image data for all the picture elements of the first line is fed to shift register 11, a latch signal 15 is generated, as shown in FIG. 6C, and image data of the first line is latched in latch circuit 14. When the first line image data is latched in latch circuit 14, the second line image data is fed to shift register 11 as shown in FIG. 6A. A print signal 20 as shown in FIG. 6D is supplied to a unit circuit of the first block for the printing with the first block for the first line. The pulse period (i.e., "1" level period) of the print signal 20 is set equal to the longest energization pulse period fed to heat generation section 21 that corresponds to the maximum print image density. The printing of each line and the transfer of image data for the next line are effected concurrently as noted above to improve the speed of printing per line.

The print signal 20 with respect to the first block is fed to enable terminal EN of counter 17, and an inversion signal of the print signal 20 is fed to clear terminal CLR of counter 17. Counter 17 thus is enabled and counts an enable clock signal 18 as shown in FIG. 6F. The output of output terminal OUT of the comparator is initially at "1" level and goes to "0" level when the count of counter 17 exceeds the output data value of latch circuit 14. While the output of output terminal OUT of the comparator is at "1" level, gate circuit 19 is held enabled to have driver circuit "on" to energize the heat generation section 21 for thermal printing. The period, during which the output of output terminal OUT of the comparator is at "1" level, corresponds to image data latched in latch circuit 14. Thus, dots with densities corresponding to the image data are printed on a printing sheet. This means that if image data supplied to a heat generation resistor, with which it is desired to print a low density dot, is set to a low value, the output of output terminal OUT of the comparator goes to "0" level while the count is small. Thus, the period of energization of the heat generation resistor can be reduced. Conversely, if a large value is set as image data supplied to a heat generation resistor, with which to print a high density dot, the output of output terminal OUT of the comparator does not go to "0" level soon, and the heat generation resistor is energized for long time. When the printing with the first block is ended, a print signal 20 for printing with the second block is fed to a unit circuit of the second block as shown in FIG. 6E. The printing with the second block for the first line is thus effected. The print signal with respect to the first and second blocks is set to be less than one half of the period necessary for the transfer of image data for one line. When the printing for the first line is ended, the printing of the second line and transfer of image data for the third line are effected.

In this embodiment, the pulse duration of the print signal 20 is set to be equal to the maximum pulse duration of the energization pulse supplied to the heat generation resistor. However, it is preferably less than the count capacity of counter 17. That is, where counter 17 is of 8 bits it is preferred to use a print signal having a duration less than 255 times the period of enable block 18. In this case, the duration of the pulse supplied to each heat generation resistor 2 can be varied continuously.

As has been shown, with the first embodiment the transfer of image data may be done only once irrespective of the number of bits, and the duration of the pulse supplied to each heat generation resistor can be controlled in the unit of the pulse of the enable clock. In other words, even in case of using 8-bit image data it is possible to obtain a maximum of 256 different kinds of energization pulses in a single image data transfer. Therefore, in case of using 8-bit image data the data transfer period can be greatly reduced compared to the prior art example it has been necessary to transfer image data eight times. The kind of the energization pulse is determined independently of the data transfer but is determined according to the capacity of counter counting enable clock pulses. It is thus possible to obtain superior gradation.

However, a thermal printer can not represent density in 256 different gradations. For instance, density can be represented only in 32 gradations even in case when a sublimable ink is used. When a thermal head is operated at a high speed, the image density considerably varied between the instant of start and instant of end of the print due to the influence of heat storage in the thermal head. Therefore, considerably fine energization pulse duration control is necessary, and a greater number of gradations than is actually used for the printing is required. For instance, even when it is desired to print an image in 32 gradations, 64 or 128 different density gradations are necessary. Further, fine pulse duration control is necessary in case when a density gradation image is expressed not by the density gradation process but with the dither process. In this embodiment, precise and satisfactory control can be obtained even in these cases.

Figure 7:
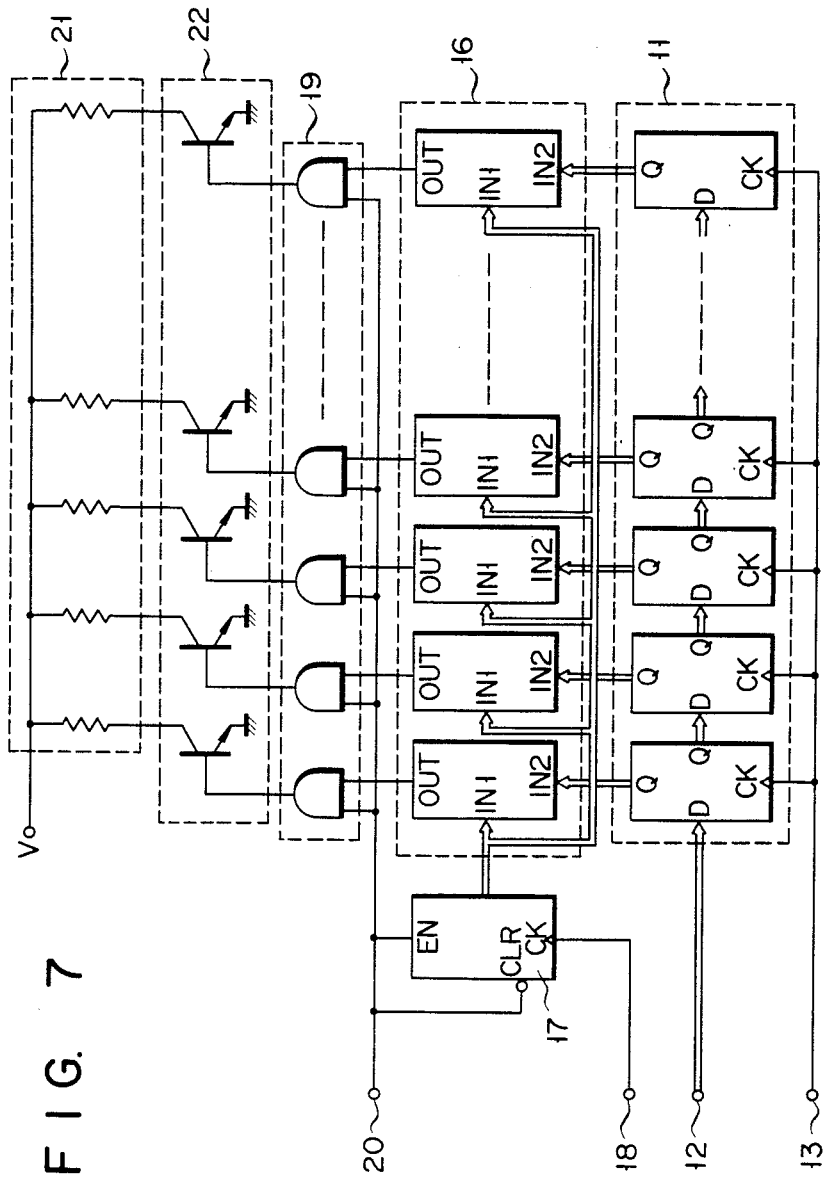
FIG. 7 is a circuit diagram showing a second embodiment of the thermal head driver circuit according to the invention.

Further embodiments of the invention will now be described. In the following embodiments, parts like those in the first embodiment are designated by same reference numerals. FIG. 7 is a block diagram showing a second embodiment. The second embodiment is the same as the first embodiment (FIG. 4) except for that latch circuit 14 is omitted. Therefore, in the second embodiment printing can not be done during the transfer of data. In the case of the block driving, however, this gives rise to no problem for printing can be done with a block while data is being transferred for another block. In this case, the printing period for one line is determined by the longer period among the period of data transfer for one block and the pulse duration of the print signal.

Figure 8A:
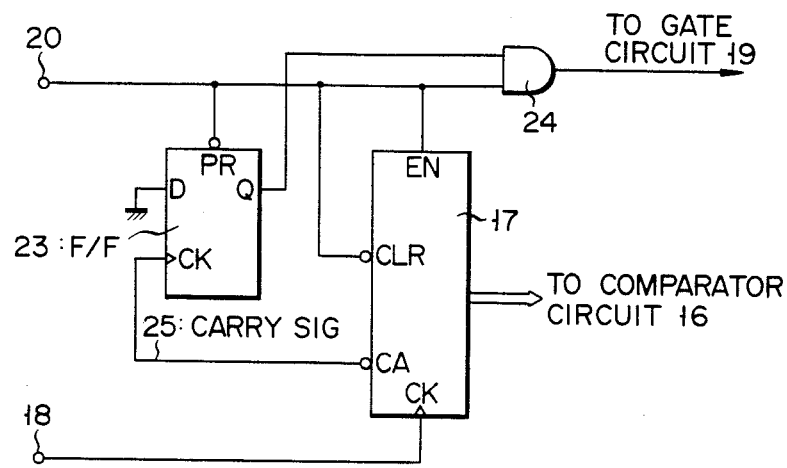
FIG. 8A is a circuit diagram showing a third embodiment of the thermal head driver circuit according to the invention.
Figure 8B:
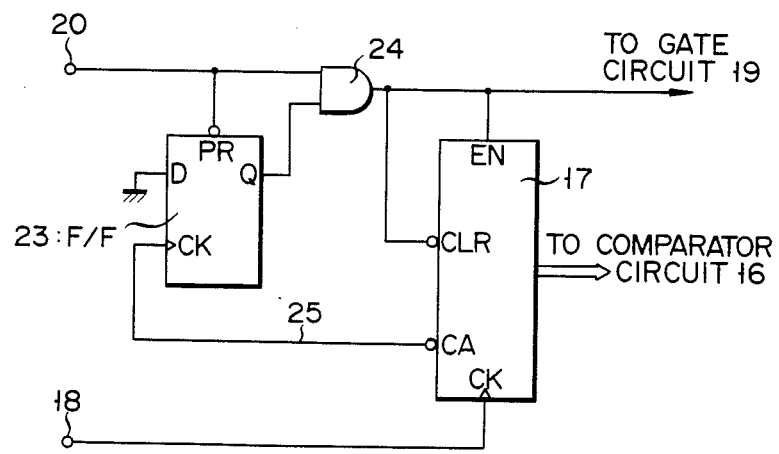
FIG. 8 is a circuit diagram showing a fourth embodiment of the thermal head driver circuit according to the invention.

FIGS. 8A and 8B are circuit diagrams showing essential parts of the third and fourth embodiments of the invention. The third and fourth embodiments are modifications of the first and second embodiments with respect to counter 17 and neighboring parts. In the first and second embodiments, the pulse duration of the print signal is preferably less than the count capacity of counter 17. In the third and fourth embodiments flip-flop 23 and gate 24 are provided in addition to counter 17. Once the maximum count of counter 17 is reached, no print signal is subsequently supplied to gate circuit 19. More specifically, a carry signal 25 that is generated upon reaching of the maximum count of counter 17 resets flip-flop 23, and AND gate 24, to which the print signal is supplied, is disabled by the output of flip-flop 23. The third and fourth embodiments are different from each other in the order of connection between counter 17 and AND gate 24.

With the third and fourth embodiments, there is no substantial need of giving considerations of the relation between the print signal 20 and enable clock 18 (i.e., making the pulse duration of the print signal 20 to be less than the count capacity of counter 17). Besides, it is possible to prevent damage to the thermal head due to erroneous operation of the circuit.

Figure 9:
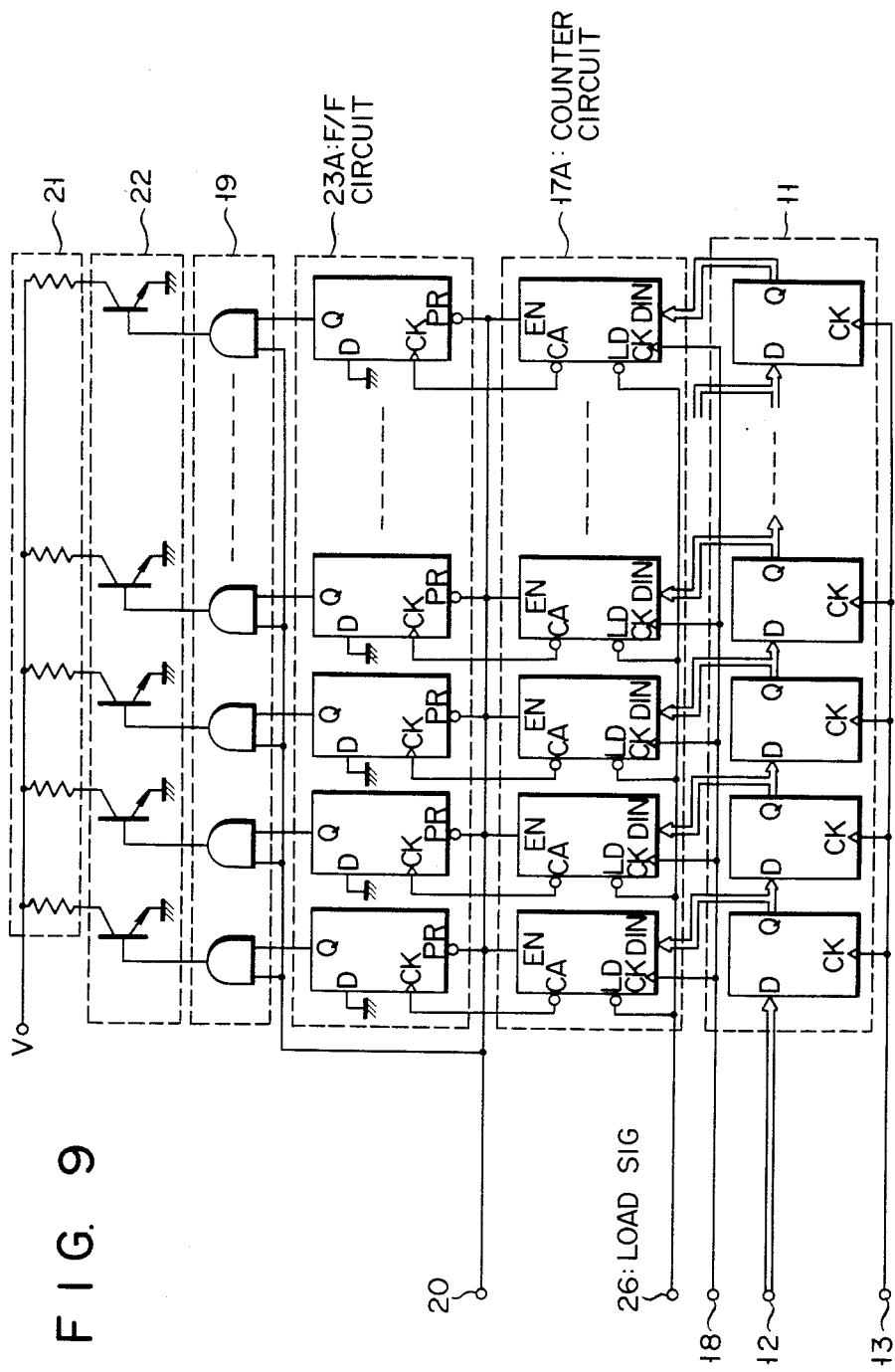
FIG. 9 is a circuit diagram showing a fifth embodiment of the thermal head driver circuit according to the invention.

FIG. 9 is a block diagram showing a fifth embodiment. In the fifth embodiment, latch circuit 14, comparator circuit 16 and counter 17 in the first embodiment (FIG. 4) are replaced with counter circuit 17A and flip-flop circuit 23A. The other parts are the same as in the first embodiment and are designated by same reference numerals. Thus, the scale of the circuit element can be considerably reduced compared to the construction shown in FIG. 4.

In this embodiment, image data 12 is transferred as parallel data through shift register 11 in synchronism to clock signal 13. When the transfer of all data is completed, load signal 26 is supplied to load terminal LD of each counter in counter circuit 17A, and data having been transferred through shift register 11 is loaded in counter circuit 17A. Load signal 26 is a signal for setting data in counter circuit 17A and is equivalent to latch signal 15 in the first embodiment.

When image data is loaded in counter circuit 17A, print signal 20 is generated. Counter circuit 17A consists of a down-counter which generates a carry signal (at "1" level) when the count is reduced to "0". Counter circuit 17A starts to down-count the enable clock 18 since print signal 20 is supplied to count enable terminal EN of counter circuit 17A. Since print signal 20 is also supplied to preset terminal PR of flip-flop circuit 23A, the output of Q output terminal is at "1" level from the generation of the print signal 20 till the generation of a carry signal which is generated when the count of counter circuit 17A is reduced to "0". As a result, the instant when a drive transistor of driver circuit 22 is turned on with the enabling of AND gate circuit 19, is determined according to the value of image data.

Flip-flop circuit 23A is constructed such that once its output becomes "0" with the appearance of a carry signal CA from counter circuit 17A after the provision of the print signal, the output will never go to "1" until the print signal becomes "0" even if carry signal CA is supplied any times. Further, like the third and fourth embodiments shown in FIGS. 8A and 8B, there is no need of taking the relation between the duration of print signal 20 and enable clock 18 into considerations.

In this embodiment, counter circuit 17A has a data-holding function, so that shift register 11 can be omitted. In this case, output terminal $D_{out}$ of each counter of counter circuit 17A may be connected to input terminal $D_{in}$ of the next stage counter. Image data may be fed to input terminal $D_{in}$ of the last stage counter, and the clock signal 13 may be fed in lieu of the load signal 26 to load terminal LD of counter circuit 17A.

Figure 1:
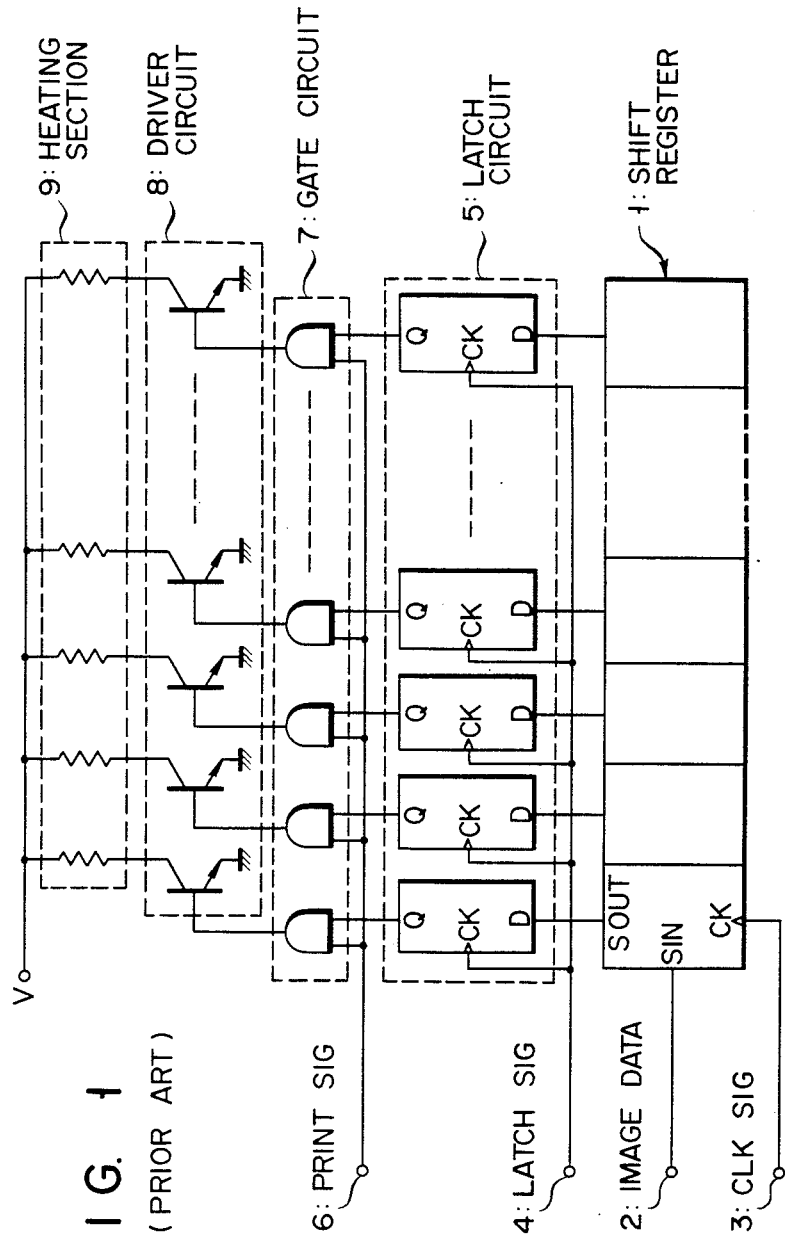
FIG. 1 is a circuit diagram showing a prior art thermal head driver circuit.
Figures 2A, 2B:
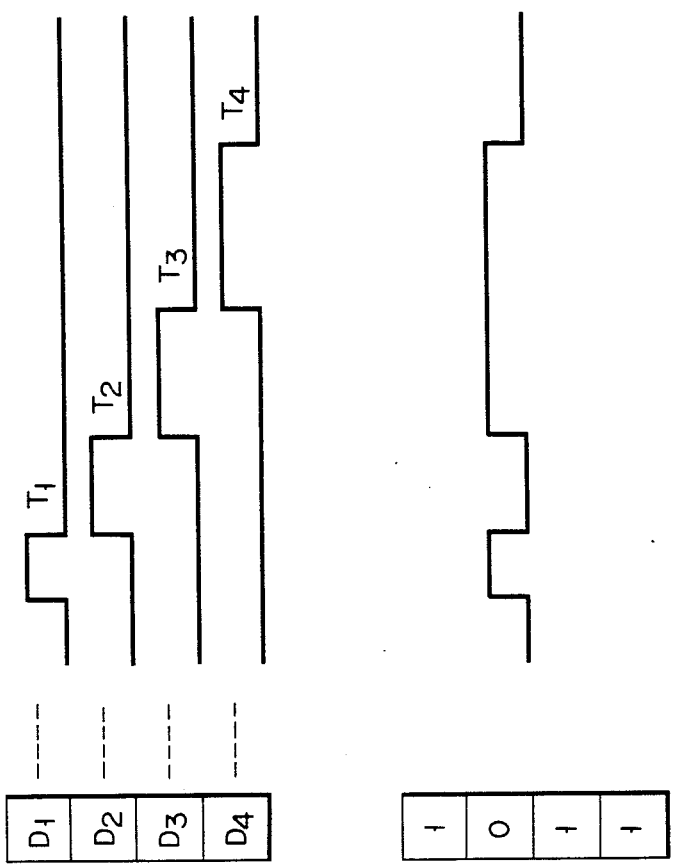
FIGS. 2A and 2B are waveform diagrams showing an example of print signal used in the thermal head driver circuit shown in FIG. 1.
Figure 10:
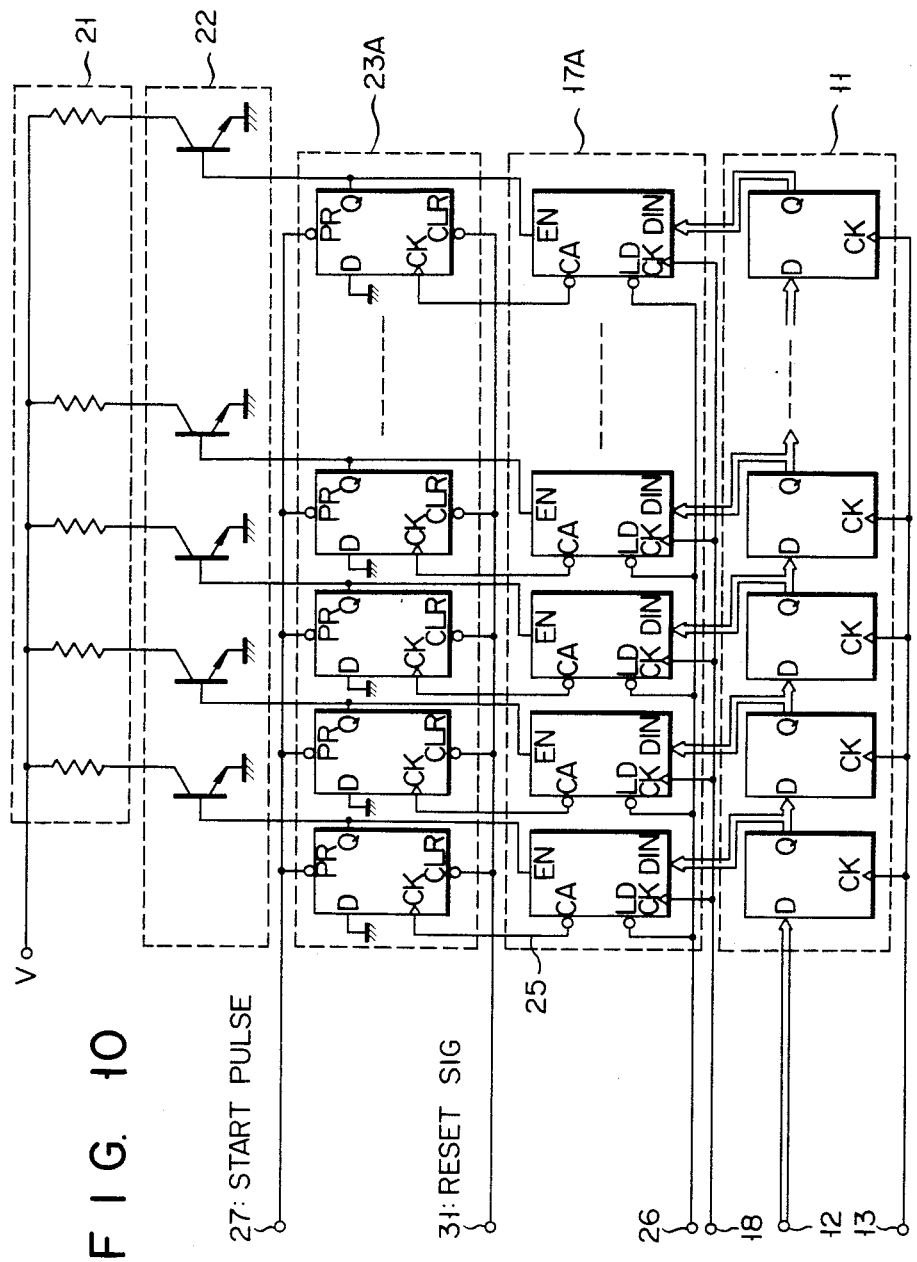
FIG. 10 is a circuit diagram showing a sixth embodiment of the thermal head driver circuit according to the invention.

FIG. 10 is a block diagram showing a sixth embodiment. In the above embodiments, the print signal, although it defines the maximum energization pulse duration, has a major role enabling counter circuit 17A. More specifically, since the energization pulse duration is determined by the time period from the generation of the print signal until the count of counter circuit 17A reaches a predetermined value, the print signal need not be a long duration signal as shown in FIG. 2A. The print signal in the sixth embodiment is a start pulse representative of the timing of the start of printing. When a print start pulse 27 is generated after image data has been set in counter circuit 17A by load signal 26, flip-flop circuit 23A is set, rendering Q outputs to be "1" level. As a result, driver circuit 22 is turned on to start energization of heating section 21. At the same time, counter circuit 17A is enabled to start counting of enable clock 18. When the preset value is counted by counter circuit 17A, carry signal 25 is output from counter circuit 17A to reset flip-flop circuit 23A, rendering the Q output thereof to be "0" level to end the energization of heating section 21.

It is to be understood that even with the sixth embodiment it is possible to make a circuit design without giving considerations to the relation between the print signal and enable clock.

Figure 11A:
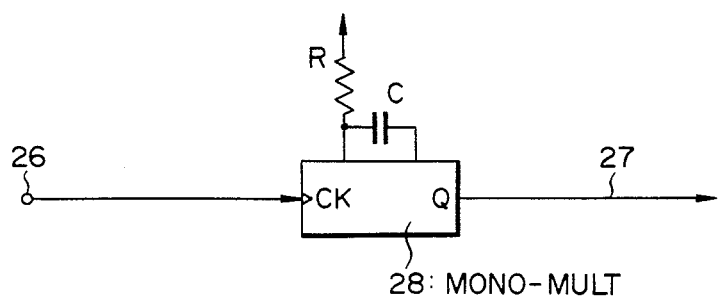
FIGS. 11A to 11C are circuit diagrams showing modifications of the sixth embodiment.
Figure 11B:
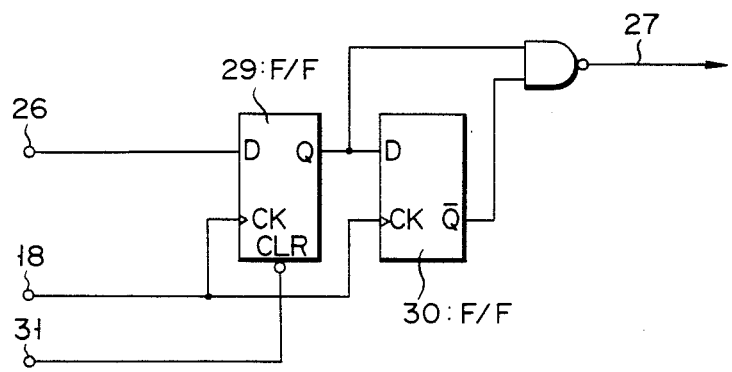

It is possible to internally generate the print start pulse 27 instead of externally supplying it. The print start pulse may be generated at any time after image data from shift register 11 has been set in counted circuit 17A. FIGS. 11A and 11B show examples of the print start pulse generation circuit. In the example of FIG. 11A, the output of monostable multivibrator 28 which is triggered by the rise of load signal 26 is used as print start signal 27. The example shown in FIG. 11B uses a delay element such as flip-flops 29 and 30. In this instance, enable clock 18 is used as the clock for flip-flops 29 and 30. The pulse duration of load signal 26 should be longer than the cycle period of enable clock 18. In this case, however, load signal 26 can be used in lieu of print start pulse 27 so that it is possible to reduce the number of external signal lines by one.

Reset signal 31 shown in FIG. 10 is for rendering the output of flip-flop circuit 23A to be "0" level. However, it may be only one which prevents current from flowing into heating section 21 at the time of the closure of the power source, and it is hardly necessary during the normal operation. For this reason, if an ordinary power-on reset circuit as shown in FIG. 11C is provided, there is no need of externally supplying reset signal 31, so that it is possible to reduce the number of signal lines by one.

Figure 11C:
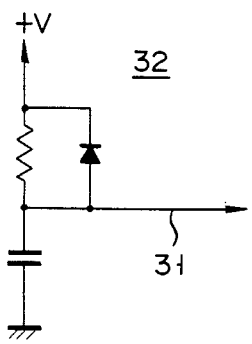

As has been shown, with the sixth embodiment shown in FIG. 10 the number of external signal lines can be reduced by using the circuits shown in FIGS. 11A to 11C, so that it is possible to simplify the circuit. In the sixth embodiment, like the preceding fifth embodiment, it is possible to omit shift register 11.

Figure 12:
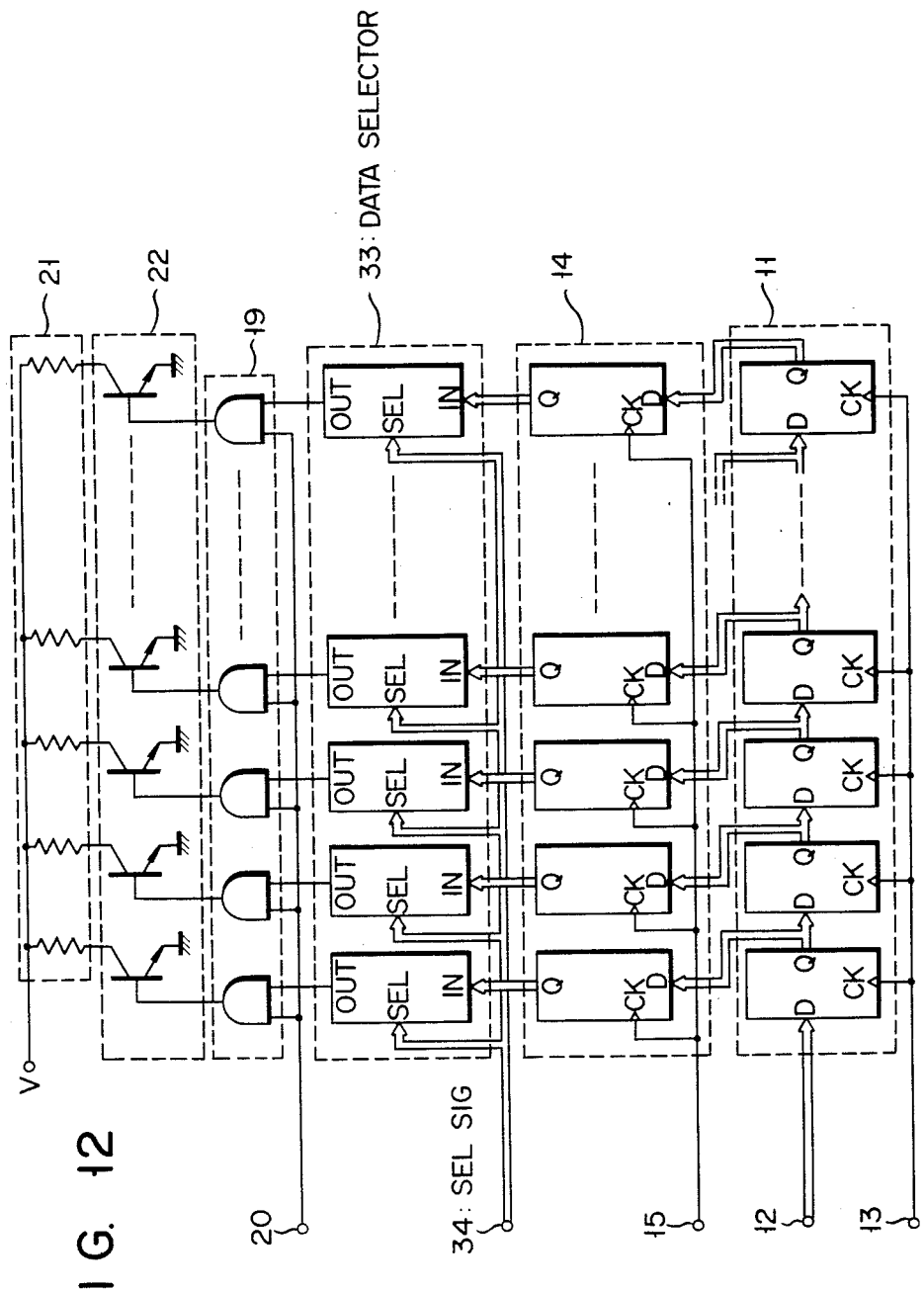
FIG. 12 is a circuit diagram showing a seventh embodiment of the thermal head driver circuit according to the invention.

FIG. 12 is a circuit diagram showing a seventh embodiment. In this embodiment, data selector 33 is provided in lieu of comparator circuit 16 in the first embodiment of FIG. 4, and counter 17 is omitted. The rest of the structure is the same as in the first embodiment.

Image data 12 for line is transferred through shift register 11 consisting of a plurality of bits in synchronism to clock signal 13. When the transfer of all image data is completed, latch signal 15 is supplied, and the data having been transferred is latched in latch circuit 14. Print signal 20 is supplied, and data select signal 34 of data selector 33 is fed to SEL terminal. Data select signal 34 consists of a plurality of bits and serves to select a predetermined bit among the image data consisting of a plurality of bits supplied from latch circuit 14.

The data selected by such data select signal 34 is fed together with print signal 20 to gate circuit 19. Gate circuit 19 receives the print signal 20, and it provides a print output at "1" level when and only when data selector 33 provides output at "1" level. The output of gate circuit 19 turns on driver circuit 22 to energize heating section 21. Of course even if print signal 20 is given, driver circuit 22 is held inoperative and heat generation section 21 is not energized so long as the output of data selector 33 is at "0" level. In the above way, a first cycle of printing is performed.

Next, the data select signal is changed to designate selection of the next bit data. Then, a print signal for the second cycle is supplied to cause a similar operation. In this way, printing is done with respect to all the bits. For example, in case of 8-bit image data, a 3-bit signal may be used as data select signal 34, and the print signal may be provided 8 times. In this case, by setting the pulse duration of each cycle print signal as shown in FIG. 2A the maximum 256 graduations can be obtained with 8-bit image data.

In the seventh embodiment, like the sixth embodiment, shift register 11 may be omitted.

Figure 13:
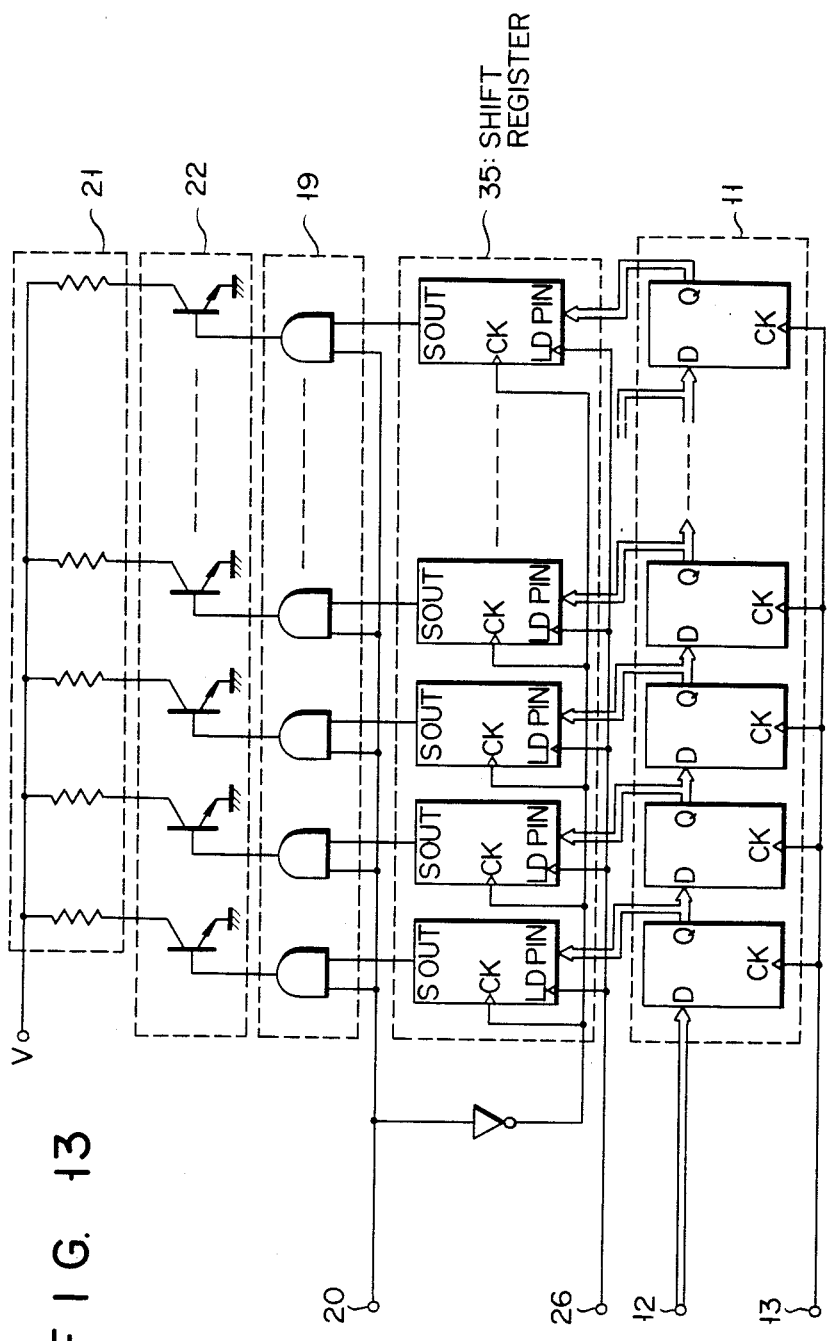
FIG. 13 is a circuit diagram showing an eighth embodiment of the thermal head driver circuit according to the invention.

FIG. 13 is a circuit diagram showing an eighth embodiment. In this embodiment, parallel-in serial-out shift register 35 is used in lieu of latch curcuit 14 and data selector 33 in the seventh embodiment shown in FIG. 12. The rest of the structure is the same as in the seventh embodiment.

With this arrangement, the scale of the circuit element can be reduced compared to the seventh embodiment. Image data 12 for one line is transferred through shift register 11 in synchronism to clock signal 13. When the transfer of all image data has been completed, load signal 26 is supplied, and the data having been transferred is loaded in parallel-in serial-out shift register 35. Print signal 20 is fed along with the output of shift register 35 to gate circuit 19. When image data 12 consisting of a plurality of bits supplied from shift register 11 is loaded according to load signal 26, shift register 35 outputs a bit among the image data. For instance, where image data 12 consists of 8 bits, when image data 12 is loaded, data of the 8th bit (which is the most significant bit) is output. Thus, when print signal 20 for the first line is output, the energization of each heat generation resistor in heating section 21 is controlled according to the most significant bit data from shift register 35. When the first cycle of printing is ended, print signal 20 is inverted before being fed to clock terminal CK of shift register 35. Thus, at the instant of termination of the print signal 20 a data shift is effected, and data of the next bit (e.g., of the 7th bit) is output from shift register 35. When print signal 20 for the second cycle of printing is subsequently provided, the energization of each heat generation resistor in heating section 21 is controlled according to the 7th bit data output from shift register 35. Likewise, energization of heat generation section 21 is controlled according to the data of each bit.

In the eighth embodiment, like the seventh embodiment, shift register 11 can be omitted.

Figure 14:
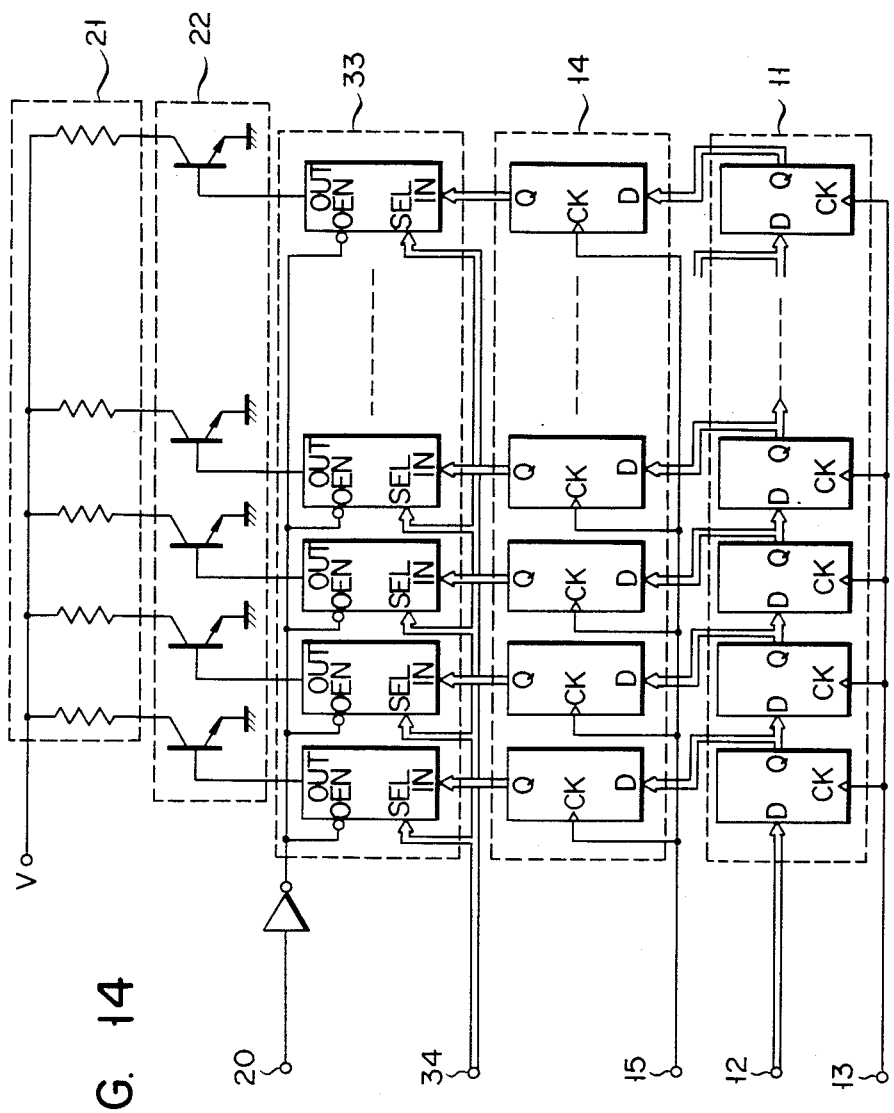
FIG. 14 is a circuit diagram showing a ninth embodiment of the thermal head driver circuit according to the invention.

FIG. 14 is a circuit diagram showing a ninth embodiment. This embodiment is arranged by removing gate circuit 19 from the seventh embodiment shown in FIG. 12 and, instead, providing data selector 33 with output enable terminal OEN. The rest of the structure is the same as in the seventh embodiment.

In this embodiment, the output of data selector 33 is at "0" level irrespective of the input signal so long as the signal at output enable terminal OEN is at "1" level. When and only when the signal at output enable terminal OEN is at "0" level, one-bit data designated by data select signal 34 is output from data selector 33. Thus, with an inverted signal obtained from print signal 20 supplied to output enable terminal OEN, heat generation section 21 is energized only when the output of data selector 33 is at "1" level attained with the supply of the print signal. Gate signal 19 thus can be omitted.

In the ninth embodiment, like the seventh embodiment, shift register 11 can be omitted.

Figure 15:
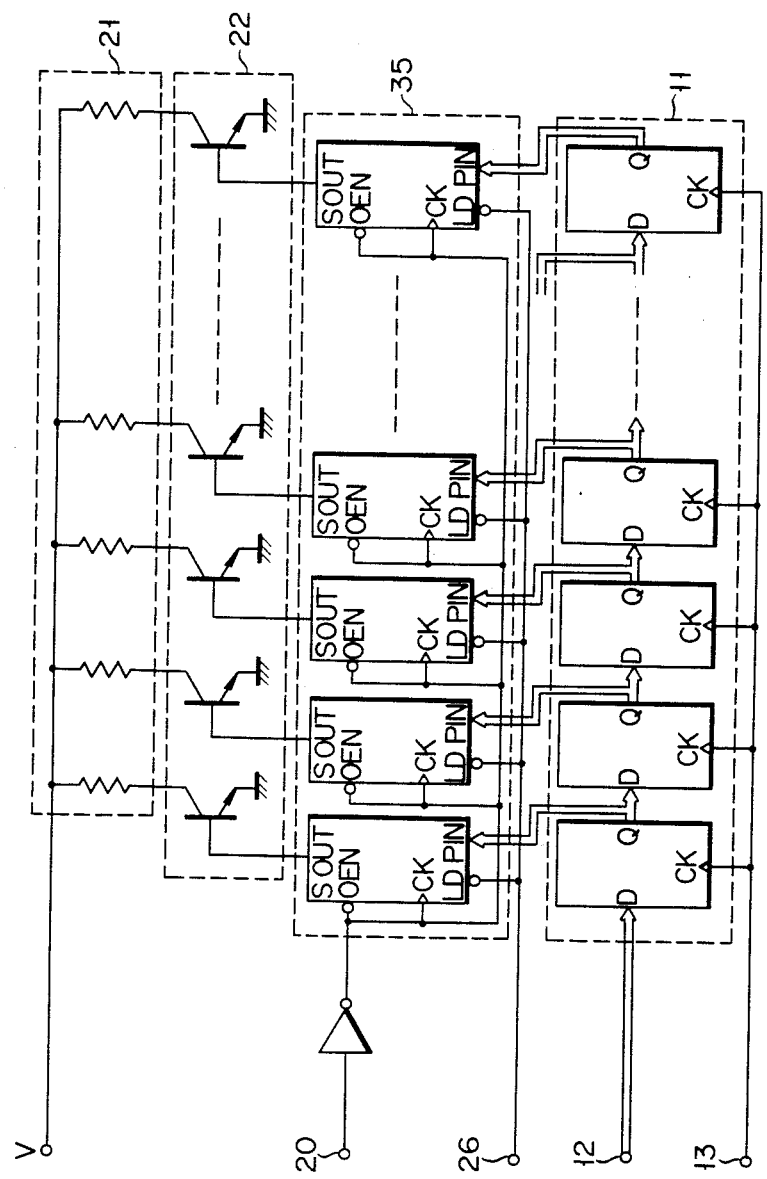
FIG. 15 is a circuit diagram showing a tenth embodiment of the thermal head driver circuit according to the invention.

FIG. 15 is a circuit diagram showing a tenth embodiment. This embodiment is arranged by removing gate circuit 19 from the eighth embodiment shown in FIG. 13 and, instead, providing shift register 35 with output enable terminal OEN. The rest of the structure is the same as in the eighth embodiment.

In this embodiment, the output of shift register 35 is at "0" level at all time irrespective of the input signal so long as the signal at output enable terminal OEN is at "1" level. Shift register 35 thus outputs data of a predetermined bit only when the signal at output enable terminal OEN is at "0" level. Thus, with an inverted signal obtained from print signal 20 fed to output enable terminal OEN, heating section 21 is energized only when the output of data selector 33 is at "1" level with the print signal 20 supplied. Gate circuit 19 thus can be omitted.

In the tenth embodiment, like the eighth embodiment, shift register 11 can be omitted.

Now, an eleventh embodiment of the invention will be described. It will be seen from FIG. 5 that the printing characteristic of the thermal head is such that the print density various continuously with the energy supplied to the heating section. In the eleventh embodiment, only a suitable number of different densities are selected from among the densities capable of printing, and a multi-graduation printing is done using the selected densities. For example, the density of one picture element can be expressed by selecting four different densities $D_1$ to $D_4$ as shown in FIG. 5 and the density of one picture element can be represented using pluralities of these densities. If a picture element is formed by arranging dots having such four different densities in a 2-by-2 matrix, it is possible to realize a maximum of 256 density combinations.

Figure 16:
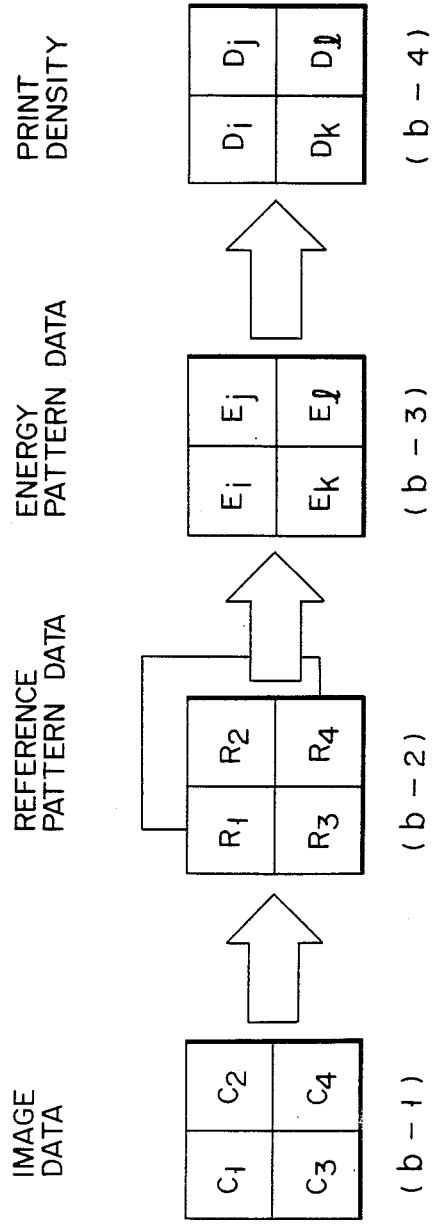
FIG. 16 is a view showing the principles underlying an eleventh embodiment of the thermal head driver circuit according to the invention.

The density of each dot in this case is determined as shown in FIG. 16. It is assumed that image data b-1 showing the density of the dot is fed from an image reader such as a scanner or any other external apparatus. Image data b-1 is compared with reference pattern data b-2 to generate energy pattern data b-3. A plurality of reference pattern data b-2 are provided, and one of them is selected according to input image data b-1. Individual data $E_i$, $E_j$, $E_k$ and $E_l$ constituting energy pattern data b-3 may be different or identical. Where four densities $D_1$ to $D_4$ are used, the data $E_i$ to $E_1$ may be either 0, $E_1$, $E_2$, $E_3$ and $E_4$. When energy pattern data b-3 is used for energization, therefore, print density b-4, $D_i$ to $D_1$, can be obtained.

Figure 17:
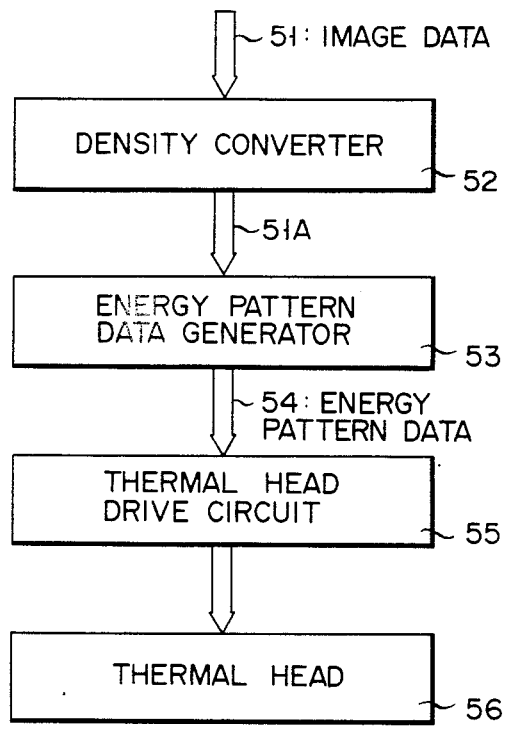
FIG. 17 is a block diagram showing the eleventh embodiment.

FIG. 17 is a circuit diagram showing an eleventh embodiment. Image data 51 consisting of a plurality of bits supplied from an external device (which is data b-1 in FIG. 16) is supplied to density converter 52. Density converter 52 converts the number of bits of image data 51 into the number of bits that can be expressed by the thermal printer or compensates the gamma characteristic of the image data. Image data 51A after the conversion is fed to energy pattern data generator 53. Energy pattern data generator 53 compares image data 51A and reference pattern data as shown in FIG. 16 and generates energy pattern data. Energy pattern data 54 consists of data consisting of a plurality of bits for each dot. Energy pattern data 54 is fed to thermal head driver circuit 55 for control of the energy for each picture element so that printing is done by thermal head 56. As thermal head driver circuit 55, the first to tenth embodiments described above can be employed. Density converter 52 may be provided either inside or outside energy pattern data generator 53.

Figure 18:
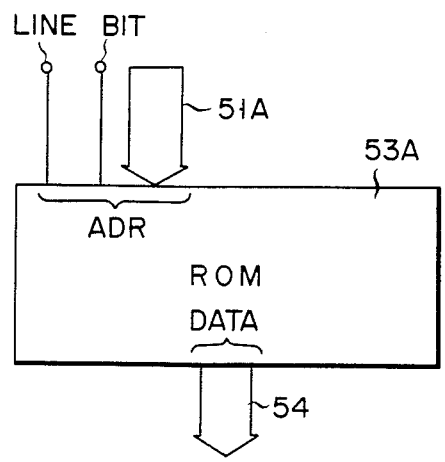
FIG. 18 is a block diagram showing an energy pattern data generator in the eleventh embodiment.

FIG. 18 is a schematic view showing energy pattern data generator 53. Least significant bit signal LINE of a line counter representing the order number of the line to be printed and the least significant bit signal BIT of a bit counter representing the order number of bit in the main scanning direction of the thermal head are fed along with density-converted image data 51A to address terminal of ROM 53A where predetermined energy pattern data has been stored, and corresponding pattern energy data 54 is provided from data terminal DATA.

Figures 19, 20:
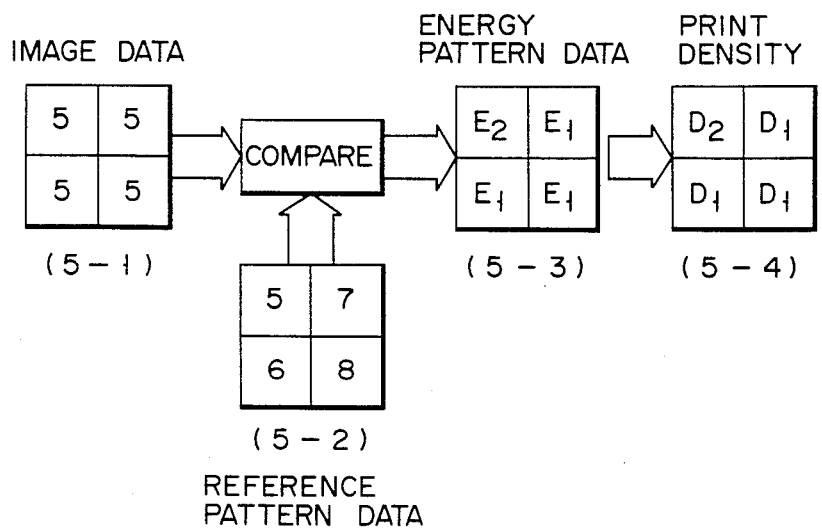
FIG. 19 is a view showing a reference pattern data used in the eleventh embodiment.
FIG. 20 is a view showing the operation of the eleventh embodiment.

ROM 53A uses dots of four densities $D_1$ to $D_4$ as described before in connection with FIG. 16 and white dot to constitute a picture element as a 2-by-2 dot matrix. Image data supplied to the address terminal of ROM 53A consists of 4 bits at the most, and 17 different density graduations including zero are supplied. In this case, four reference pattern data 4-1 to 4-3 as shown in FIG. 19 are stored in ROM 53A. One of these reference pattern data is selected according to the input data, and the two are compared. When image data of density 5 is selected, reference pattern data 4-2 shown in FIG. 19 is selected. When image data of density 14 is selected, reference pattern data 4-4 shown in FIG. 19 is selected. These reference pattern data correspond to the energy shown in FIG. 5. When reference pattern data 4-1 is selected, energy pattern data corresponding to $E_1$ is provided. When reference pattern data 4-2, 4-3 and 4-4 are selected, energy pattern data corresponding to $E_2$, $E_3$ and $E_4$, respectively, are provided. The numeral of each dot of each reference pattern data represents a threshold density. When the density of the input image data is above the threshold value, energy pattern data corresponding to the reference pattern data is output. When the density of the input image data is below the threshold value, the reference pattern data corresponding to a density value next lower to the corresponding density is output as energy pattern data.

The LINE signal and BIT signal noted above represent the position of each dot of each reference pattern data. When the LINE and BIT signals are (0,0), a threshold value for the upper left dot is read out. When these signals are (0,1), a threshold value for the upper right dot is read out. When these signals are (1,0), a threshold value for the lower left dot is read out. When these signals are (1,1), a threshold value for the lower right dot is read out. The read-out threshold value is compared to input image data.

For example, when data of density 5 is supplied, reference pattern data 4-2 in FIG. 19 is selected. If the LINE and BIT signals represent the first dot in the first line at this time, the data of the upper left point (which is 5 at this time) is read out from the reference pattern data. Since the input image data is "5", the value of $E_2$ is provided as energy pattern data 54. This manner is shown in FIG. 20.

Next, image data of the second bit of the first line is supplied. In this case, data of the upper right point (which is 5) among the image data 5-1 shown in FIG. 20 is supplied. Then image data of the upper right point (which is 7) is read out from reference pattern data 5-2 shown in FIG. 20. Since the input image data is less than the reference pattern data, the value of $E_1$ is provided as energy pattern data 54. In this way, all the data for the first line is converted to energy pattern data.

When the conversion for the first line is completed, the data for the second line is supplied. In this case, data of the lower left dot (which is 5) and data of the right lower dot (which is 5) are supplied from image data 5-1 shown in FIG. 20. Then, energy pattern data of the first bit in the second line is $E_1$, and energy pattern data of the second bit in the second line is $E_1$.

Thus, the energy pattern data with respect to image data 5-1 is shown in 5-3 in FIG. 20. Thus, when the energy is controlled by the thermal head driver 55 according to the energy pattern, a print image having density as shown in 5-4 in FIG. 20 can be obtained.

Figure 21:
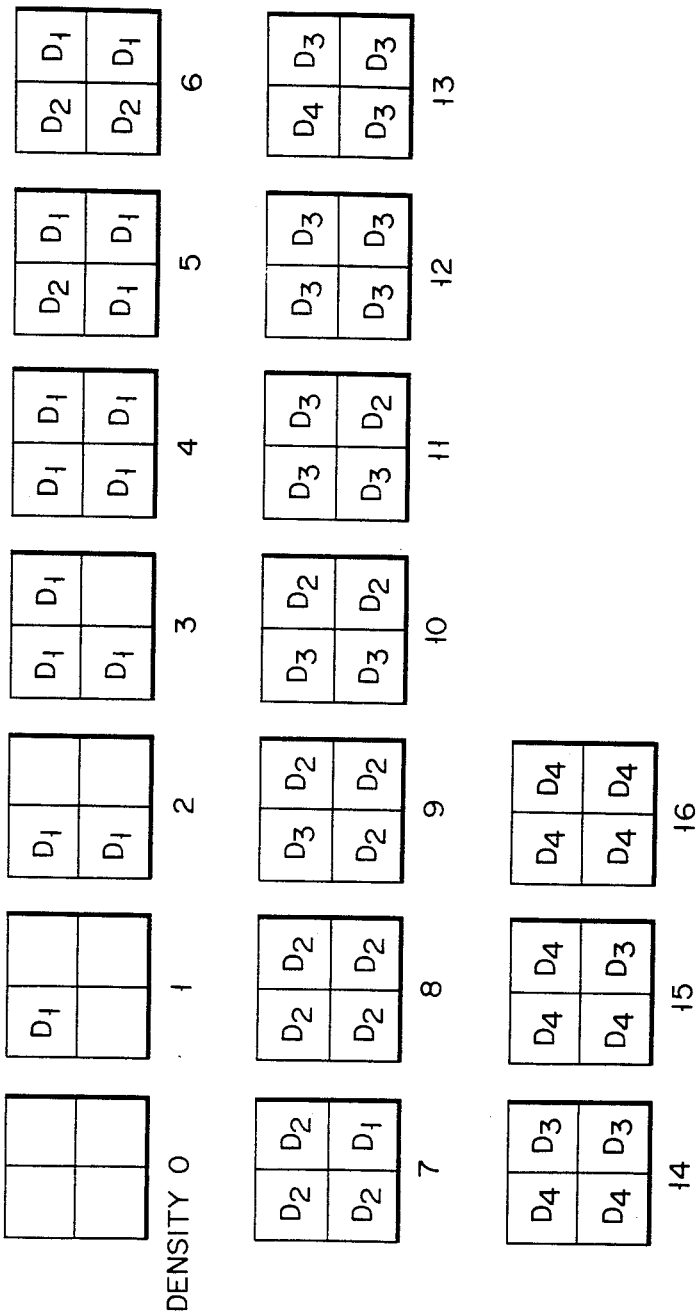
FIG. 21 is a view showing the density of each dot when image data 0 to 16 is supplied in the eleventh embodiment.
Figure 22:
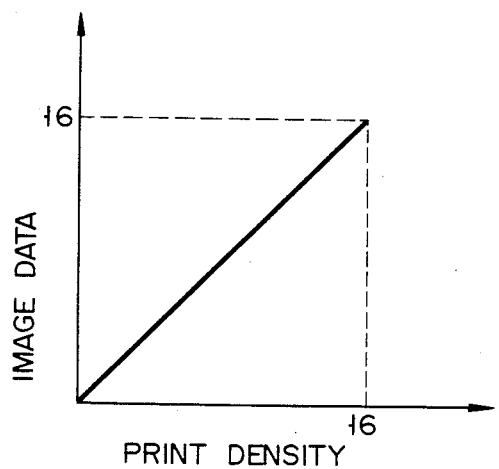
FIG. 22 is a view showing the relation between image data and print density of each picture element in the eleventh embodiment.

FIG. 21 shows a case where the input image data is not changed in a 2-by-2 matrix. That is, it shows the density of each dot when image data with densities 0 to 16 is supplied. When densities $D_2$, $D_3$ and $D_4$ are twice, three times and four times of $D_1$, respectively, the relation between the print density of a picture element consisting of 2-by-2 matrix dots and input image data is substantially proportional as shown in FIG. 22.

The input image data shown in 5-1 in FIG. 20 has been treated as being free of density variation in the 2-by-2 matrix. Generally, however, such a condition is not satisfied at all time. For instance, when data of a character or the like is input, there will occur a considerably sudden density change even in the same matrix. In such a case, the print dot of high density is $D_4$, and that of low density is $D_1$. That is, dots which are considerably different in the density from one another in the 2-by-2 matrix coexist.

As is shown, in the eleventh embodiment. In addition, the density level of each dot is selected from a continuous density variation with respect to energy through comparison of image data and preset reference pattern data. Thus, it is possible to obtain a high quality multiple-graduation print. Further, to represent such multiple graduations there is no need of increasing the matrix size of the one picture element. Therefore, will occur no deterioration of the resolution of the reproduced image, and it is possible to correspond to even a input image data density change and obtain a clear print of characters or the like.

Figure 23:
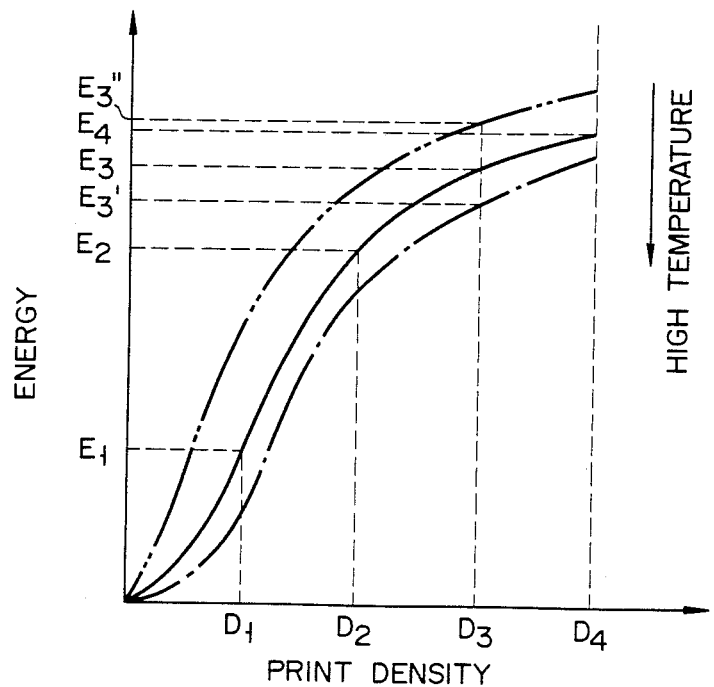
FIG. 23 is a view showing the relation between amount of energy supplied and print density with the temperature taken as a third parameter in the eleventh embodiment.

A twelfth embodiment, in which the influence of heat storage is considered, now will be described. FIG. 23 shows the relation between energy and print dot density with the temperature taken as a third parameter. FIG. 23 shows a recording characteristic in which the temperature of heat generation resistor before the printing is taken as a parameter. The solid curve represents the normal characteristic. The dot-and-bar curve represents the characteristic when the temperature of the heat generation resistor is elevated due to an ambient temperature increase or due to heat storage. The double-dot-and-bar curve represents the characteristic when the temperature is reduced. Usually, when energy of $E_3$ is given, the density of print dot is normally $D_3$. When the temperature is elevated, the density is higher than $D_3$ with the same energy. When the temperature is reduced, the density is lower than $D_3$. Accordingly, to provide the same density of $D_3$ irrespective of the temperature, energy of $E_3'$ may be supplied to each heat generation resistor when the temperature is high, and energy of $E_3''$ when the temperature is low. Therefore, it is necessary to provide a circuit, which can control the amount of energy supplied to each heat generation resistor according to the temperature thereof.

FIG. 24 is a block diagram showing a twelfth embodiment. This embodiment is arranged by adding temperature controller 61 to the eleventh embodiment shown in FIG. 17. The temperature of thermal head 56 is estimated, and control data 63 is generated to obtain a constant density irrespective of the temperature. Control data 63 added to input image data 51 fed to energy pattern generator 53.

The same effects as shown above can also be obtained with an arrangement as shown in FIG. 25. In this case, energy pattern data 54 provided from energy pattern generator 53 and temperature data 62 of the thermal head are fed to temperature controller 61.

In either case, when temperature controller 61 determines that the temperature of thermal head 56 is higher than a preset temperature, it provides negative control data 63. In this case, energy pattern data 54 fed to thermal head driver circuit 55 is reduced. When temperature controller 61 determines that the temperature of thermal head 56 is lower than the preset temperature, on the other hand, positive control data 63 is provided. In this case, energy pattern data 54 supplied to thermal head driver circuit 55 is increased.

Figure 26:
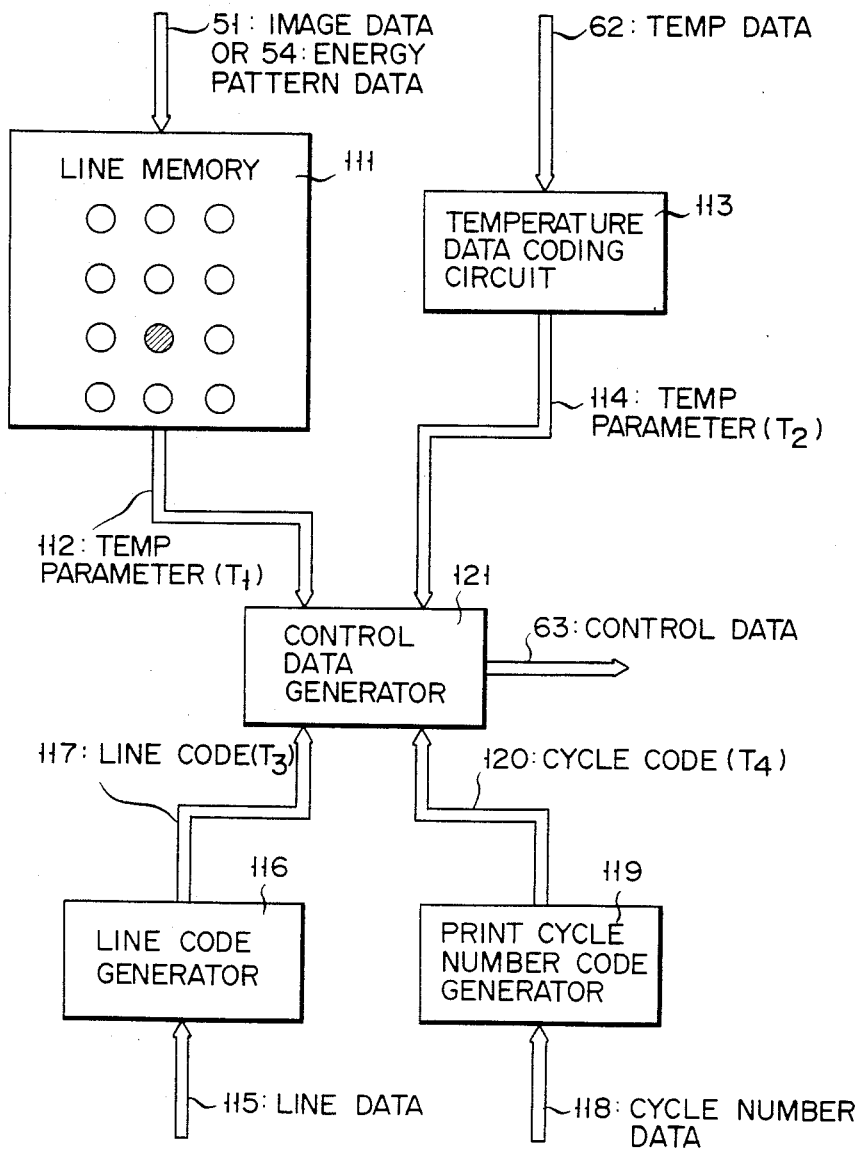
FIG. 26 is a block diagram showing the details of a temperature controller in the twelfth embodiment.

FIG. 26 shows the details of temperature controller 61 in the twelfth embodiment. Image data 51 or energy pattern data 54 are fed to line memory 111. Line memory 111 has a capacity corresponding to three picture elements by four lines, and it stores the past input data and present data. In this case, the heat storage state with respect to a picture element in question (which is shown shaded) is estimated from the pattern of image data in the illustrated range in the neighborhood of the noted picture element, whereby temperature parameter ($T_1$) 112 is provided. Temperature data 62 provided from a heat-sensitive element such as a thermistor is supplied from thermal head 56. Temperature data 62 is fetched in temperature data coding section 113 for A/D conversion and subsequent suitable coding to produce temperature parameter ($T_2$) 114.

Further, line order number data 115 representing the order number of line of presently printed data in the auxiliary scanning direction is supplied to line code generator 116 for conversion to a suitable code, which is provided as line number code data ($T_3$) 117. This is done so for the purpose of compensating for change in the image density at the instant of the start and instant of end of printing when heat storage is produced, i.e., for compensating for what can not be controlled from data for each bit for several lines fetched in line memory 111.

Further, to compensate for the density difference every image frame of a longer cycle period, data 118 representing the number of printing cycles is supplied to print cycle number code generator 119 to be provided as print cycle number code ($T_4$) 120. Print cycle number code ($T_4$) 120 is supplied only in case of continuous printing, and it is not provided in case of printing a single image. Further, considerable information is obtained from a thermistor with respect to long heat storage. In this case, therefor, print cycle number data 118 is not used.

The above four data are supplied to control data generator 121. Control data generator 121 estimates, from these data, the temperature of each heat generation resistor in the picture element in question immediately before the printing, and provides control data 63 depending on whether the temperature is higher or lower than a preset temperature. If control data generator 121 is formed from a ROM, the circuit scale can be reduced. As data supplied to control data generator 121, not all but some of the above examples may be used for control according to the print speed or resolution of the thermal head.

By so doing, it is possible to minimize fluctuations of the dot density which is affected by heat storage or ambient temperature, so that it is possible to obtain a stable print image at all time and increase the print sheet compared to the prior art.

FIG. 27 shows a thirteenth embodiment of the invention. In this embodiment, image data 13-1 and reference pattern data 13-2 are compared, a ROM is used as energy pattern generator 53 for generating energy pattern data 13-3, and energy pattern data is generated on the basis of the following roles.

(1) When the input image data is not greater than the threshold value of reference pattern data, the output energy is made "0".

(2) The output energy is made $E_4$ when input image data is greater than the threshold value of reference pattern data and greater than the next threshold value.

(3) When input image data is greater than the threshold value of the reference pattern and is less than the next threshold value, a value of $E_{(4n-1)}$ is provided as energy data. In this case, n represents the order number of threshold input image data.

The relation between the actual ROM address and data can be represented by a Table below.

TABLE

| ADR | | DAT | ADR | | DAT |
|---|---|---|---|---|---|
| LINE | BIT | INPUT IMAGE DATA | PULSE DULATION DATA | LINE | BIT | INPUT IMAGE DATA | PULSE DULATION DATA |
| 0 | 0 | 0 | 0 | 1 | 0 | 0 | 0 |
| | 1 | 0 | 0 | | 1 | 0 | 0 |
| | 0 | 1 | $E_1$ | | 0 | 1 | 0 |
| | 1 | 1 | 0 | | 1 | 1 | 0 |
| | 0 | 2 | $E_2$ | | 0 | 2 | 0 |
| | 1 | 2 | 0 | | 1 | 2 | 0 |
| | 0 | 3 | $E_3$ | | 0 | 3 | 0 |
| | 1 | 3 | 0 | | 1 | 3 | 0 |
| | 0 | 4 | $E_4$ | | 0 | 4 | 0 |
| | 1 | 4 | 0 | | 1 | 4 | 0 |
| | 0 | 5 | $E_4$ | | 0 | 5 | $E_1$ |
| | 1 | 5 | 0 | | 1 | 5 | 0 |
| | 0 | 6 | $E_4$ | | 0 | 6 | $E_2$ |
| | 1 | 6 | 0 | | 1 | 6 | 0 |
| | 0 | 7 | $E_4$ | | 0 | 7 | $E_3$ |
| | 1 | 7 | 0 | | 1 | 7 | 0 |
| | 0 | 8 | $E_4$ | | 0 | 8 | $E_4$ |
| | 1 | 8 | 0 | | 1 | 8 | 0 |
| | 0 | 9 | $E_4$ | | 0 | 9 | $E_4$ |
| | 1 | 9 | 0 | | 1 | 9 | $E_1$ |
| | 0 | 10 | $E_4$ | | 0 | 10 | $E_4$ |
| | 1 | 10 | 0 | | 1 | 10 | $E_2$ |
| | 0 | 11 | $E_4$ | | 0 | 11 | $E_4$ |
| | 1 | 11 | 0 | | 1 | 11 | $E_3$ |
| | 0 | 12 | $E_4$ | | 0 | 12 | $E_4$ |
| | 1 | 12 | 0 | | 1 | 12 | $E_4$ |
| | 0 | 13 | $E_4$ | | 0 | 13 | $E_4$ |
| | 1 | 13 | $E_1$ | | 1 | 13 | $E_4$ |

TABLE-continued

| LINE | BIT | ADR INPUT IMAGE DATA | DAT PULSE DULATION DATA | LINE | BIT | ADR INPUT IMAGE DATA | DAT PULSE DULATION DATA |
|---|---|---|---|---|---|---|---|
| | 0 | 14 | $E_4$ | | 0 | 14 | $E_4$ |
| | 1 | 14 | $E_2$ | | 1 | 14 | $E_4$ |
| | 0 | 15 | $E_4$ | | 0 | 15 | $E_4$ |
| | 1 | 15 | $E_3$ | | 1 | 15 | $E_4$ |
| | 0 | 16 | $E_4$ | | 0 | 16 | $E_4$ |
| | 1 | 16 | $E_4$ | | 1 | 16 | $E_4$ |

By setting data in energy pattern generator 53 in the above way, it is possible to print graduation pattern data as shown in FIG. 28. Of course, the graduation printing variously by altering the data in the ROM.

The above embodiments of the invention are by no means limitative, but can be suitably modified without departing from the scope of the invention. For example, in the above description the reference pattern and other data have been treated as 2-by-2 matrices, but it is also possible to treat data in 3-by-3 and 3-by-4 matrices. Further, while all energy controls have been done through pulse duration control, it is also possible to combine pulse duration modulation and voltage modulation. If all controls are done through control of the pulse duration, the pulse duration will change extremely greatly to maintain a constant density in such case when the ambient temperature is subject to changes in a range from zero degree to 40 degrees centigrade. In this case, the calculation of the control data is extremely complicated. The control of energizing current can be simplified by using temperature parameters $T_1$ to $T_4$ obtained from the thermal head temperature data for the control of the thermal head voltage and using the other parameters for the control of the energization current. In this case, the pulse duration is not changed substantially, so that it is to obtain stable printing.

What is claimed is:

1. A driver circuit for a thermal head having a plurality of heat generation elements in an array, each heat generation element being subjected to produce heat in accordance with an externally supplied image data, comprising:
    means for cyclically receiving a plurality of image data corresponding to said heat generating elements, each image data comprising n (arbitrary positive integer) bits and representing one of $2^n$ density graduations for one dot of an image;
    pulse generating means for generating a plurality of driving pulses in response to the plurality of image data received by said receiving means, each of said plurality of driving pulses being generated for each of said heat generation elements, a cycle of generating the driving pulse being the same as that of receiving the image data and a duration time of each single driving pulse corresponding to one of the $2^n$ density graduations of corresponding image data; and
    drive means for energizing the plurality of heat generation elements during periods of the duration times determined by corresponding driving pulses generated by said pulse generating means, whereby each heat generation element produces heat whose amount corresponds to the multiple density graduation of the image data.

2. A driver circuit according to claim 1, in which said pulse generating means comprises:
    means for counting clock pulses; and
    means for comparing a counted value of said counting means with said plurality of image data and for generating output signals as said plurality of driving pulses.

3. A driver circuit according to claim 1, in which said pulse generating means comprises:
    means for presetting said plurality of image data as initial values of as counted values;
    means for decreasing the counted values in response to clock pulses; and
    a plurality of comparing means for respectively comparing the counted values with zero and for generating output signals as said plurality of driving pulses.

4. A driver circuit according to claim 3, in which each of said comparing means comprises flip-flop means which is set at a start of the decrease of the counted value and reset when the counted value equals zero an for generating an output signal as said driving pulse.

5. A driver circuit according to claim 1, further comprising:
    means for detecting a temperature of said thermal head; and
    means for modifying the duration times of said plurality of driving pulses supplied to said drive means in accordance with the temperature detected by said detecting means.

6. A thermal printer comprising:
    thermal head means having m (first arbitrary positive integer) heat generating elements, each of said elements printing a dot representing one of $2^n$ (n: second arbitrary positive integer) density graduations;
    means for storing m cyclically received image data, each image data comprising n bits and representing one of $2^n$ density graduations;
    pulse generating means for generating m pulses each of which is generated for each of said m heat generating elements, a cycle of generating the pulses being the same as that of receiving the image data, each pulse having a single pulse duration corresponding to the $2^n$ density graduations represented by each of said image data stored in said storing means; and
    drive means for energizing each of the heat generating elements during a period of time corresponding to the pulse duration of each of said pulses.

7. A thermal printer according to claim 6, in which said storing means comprises shift register means having a plurality of registers which are equal to said heat generating elements in number, each of the registers storing the image data for each heat generating element, the image data for each heat generating element being input and shifted through the registers in parallel.

8. A thermal printer according to claim 7, in which said pulse generating means comprises:
- means for clearing a counted value;
- means for increasing the counted value in response to clock pulses;
- a plurality of comparator means which equal to said heat generating elements in number, each of the comparator means comparing the counted value with the image data and generating the pulse when the counted value is smaller than the image data.

9. A thermal printer according to claim 7, in which said pulse generating means comprises:
- a plurality of counting means which are equal to said heat generating elements in number and which decreases counted value in response to clock pulses;
- means for presetting each of the image data stored in said storing means as an initial value of the counted value of each of said plurality of counting means;
- a plurality of flip-flop means which are respectively connected to said plurality of counting means and which are set at a start of the decrease of the counted value, each of which is reset when the counted value equal to zero and generates an set output as the pulse.

10. A thermal printer according to claim 6, further comprising:
- means for detecting a temperature of said thermal head; and
- means for detecting a temperature of said thermal head; and means for modifying the pulse durations of the pulses supplied to said drive means in accordance with the temperature detected by said detecting means.

11. A thermal printer according to claim 6, further comprising:
- image data converting means for converting image data into energy pattern data representing a part of the multilevel graduation density in accordance with the multilevel graduation density of the dot and a position of the dot in a dot matrix forming one pixel; and
- means for supplying the energy pattern data to said drive means as the image data.

12. A thermal printer according to claim 11, in which said image data converting means comprises:
- memory means for storing reference patterns having a data matrix of threshold values for respective densities of a pixel;
- comparing means for comparing the image data for the dot matrix forming one pixel and the reference pattern which is read out from said memory means in accordance with the density of the pixel; and
- means for generating the energy pattern data in accordance with results of comparison by said comparing means.

* * * * *